US012559323B2

(12) United States Patent    (10) Patent No.:   US 12,559,323 B2

DeVries et al.     (45) Date of Patent:     Feb. 24, 2026

(54) CONVEYOR BELT CLEANER SCRAPER BLADE MOUNT

(71) Applicant: Flexible Steel Lacing Company, Downers Grove, IL (US)

(72) Inventors: Brett E. DeVries, Comstock Park, MI (US); Mark Tomandl, Cedar Springs, MI (US)

(73) Assignee: Flexible Steel Lacing Company, Downers Grove, IL (US)

( * ) Notice: Subject to any disclaimer, the term of this patent is extended or adjusted under 35 U.S.C. 154(b) by 213 days.

(21) Appl. No.: 18/129,484

(22) Filed: Mar. 31, 2023

(65) Prior Publication Data

US 2023/0312265 A1     Oct. 5, 2023

Related U.S. Application Data

(60) Provisional application No. 63/326,691, filed on Apr. 1, 2022.

(51) Int. Cl.
    B65G 45/12     (2006.01)
(52) U.S. Cl.
    CPC ................................... B65G 45/12 (2013.01)
(58) Field of Classification Search
    CPC ................................ B65G 45/12; B65G 45/16
    See application file for complete search history.

(56) References Cited

U.S. PATENT DOCUMENTS

| | | |
|---|---|---|
| 936,887 A | 10/1909 | Healey |
| 3,342,312 A | 9/1967 | Reiter |

(Continued)

FOREIGN PATENT DOCUMENTS

| | | |
|---|---|---|
| CA | 1221050 | 4/1987 |
| CA | 2116581 | 3/1993 |

(Continued)

OTHER PUBLICATIONS

IPSearch History Oct. 2, 2025 UTC; InnovationQ+; https://iq.ip.com/discover (Year: 2025).*

(Continued)

*Primary Examiner* — Gene O Crawford
*Assistant Examiner* — Abby A Jorgensen
(74) *Attorney, Agent, or Firm* — Fitch, Even, Tabin & Flannery LLP

(57) ABSTRACT

In one aspect, a scraper blade mount for a conveyor belt cleaner is provided that includes a resilient, unitary blade mount member. The unitary blade mount member has an upwardly extending blade support portion configured to have a scraper blade mounted thereto and an upwardly extending base portion configured to be fixed to an elongate support of a conveyor belt cleaner. The blade mount member has a lower arcuate portion connecting the base portion and blade support portion that permits movement of the cleaner blade support portion toward the base portion during operation of the conveyor belt cleaner. The blade mount member further includes a pocket having an upwardly facing opening and a blocker connected to the blade mount member configured to limit debris from entering the upwardly facing opening and accumulating in the pocket. The debris may be scraped material, dust, and/or dirt as some examples.

33 Claims, 16 Drawing Sheets

(56) References Cited

U.S. PATENT DOCUMENTS

| | | | |
|---|---|---|---|
| 3,631,968 A | 1/1972 | Ward | |
| 3,656,610 A | 4/1972 | Mcwilliams | |
| 3,674,131 A | 7/1972 | Matson | |
| 3,767,210 A | 10/1973 | Havens et al. | |
| 3,841,469 A | 10/1974 | Scott | |
| 3,841,470 A * | 10/1974 | Meguro | B65G 45/16 |
| | | | 474/92 |
| 3,875,613 A | 4/1975 | Pincus | |
| 3,952,863 A | 4/1976 | Schattauer | |
| 3,994,384 A | 11/1976 | Reiter | |
| 3,994,388 A | 11/1976 | Reiter | |
| 4,031,252 A | 6/1977 | Sullivan et al. | |
| 4,036,354 A | 7/1977 | Reiter | |
| 4,053,045 A | 10/1977 | Reiter | |
| 4,105,109 A | 8/1978 | Schultz | |
| 4,182,444 A | 1/1980 | Fisher | |
| 4,189,046 A | 2/1980 | Ward et al. | |
| 4,249,650 A | 2/1981 | Stahura | |
| 4,359,150 A | 11/1982 | Bowman et al. | |
| 4,529,084 A | 7/1985 | Zhang | |
| 4,533,035 A | 8/1985 | Reiter | |
| 4,533,036 A | 8/1985 | Gordon | |
| 4,533,037 A | 8/1985 | Kerr | |
| 4,541,523 A | 9/1985 | Stockton | |
| 4,586,600 A | 5/1986 | Lindbeck | |
| 4,620,627 A | 11/1986 | Griffiths | |
| 4,633,999 A | 1/1987 | Perneczky | |
| 4,639,967 A | 2/1987 | Bordignon | |
| 4,641,852 A | 2/1987 | Kerst et al. | |
| 4,658,949 A | 4/1987 | Reicks | |
| 4,694,952 A | 9/1987 | Meijer | |
| 4,696,389 A | 9/1987 | Schwarze | |
| 4,768,644 A | 9/1988 | Cromm | |
| 4,779,716 A | 10/1988 | Gordon | |
| 4,792,154 A | 12/1988 | Kerst et al. | |
| 4,825,996 A | 5/1989 | Davidts | |
| 4,836,356 A | 6/1989 | Mukai | |
| 4,838,409 A | 6/1989 | Rappen | |
| 4,850,474 A | 7/1989 | Schwarze | |
| 4,854,443 A | 8/1989 | Gordon | |
| 4,887,329 A | 12/1989 | Perneczky | |
| 4,915,211 A | 4/1990 | Dohmeier | |
| 4,917,231 A | 4/1990 | Swinderman | |
| 4,953,689 A | 9/1990 | Peterson et al. | |
| 4,962,845 A | 10/1990 | Gibbs | |
| 5,011,002 A | 4/1991 | Gibbs | |
| 5,014,844 A | 5/1991 | Anttonen | |
| 5,016,746 A | 5/1991 | Gibbs | |
| 5,031,750 A | 7/1991 | Barnes | |
| 5,082,106 A | 1/1992 | Schwarze | |
| 5,088,965 A | 2/1992 | Swinderman et al. | |
| 5,114,000 A | 5/1992 | Rappen | |
| 5,213,197 A | 5/1993 | Mohri | |
| 5,222,588 A | 6/1993 | Gordon | |
| 5,247,778 A | 9/1993 | Tisma | |
| 5,301,797 A | 4/1994 | Hollyfield, Jr. et al. | |
| 5,372,244 A | 12/1994 | Morin | |
| 5,518,107 A | 5/1996 | Schwarze | |
| 5,573,102 A | 11/1996 | Puchalla | |
| 5,611,524 A | 3/1997 | Gordon | |
| 5,692,595 A | 12/1997 | Gilbert | |
| 5,727,670 A | 3/1998 | Johnson | |
| 5,797,477 A | 8/1998 | Veenhof | |
| 5,826,700 A | 10/1998 | Brink | |
| 5,865,997 A | 2/1999 | Isaacs | |
| 5,950,803 A | 9/1999 | Schwarze | |
| 5,975,281 A | 11/1999 | Yoshizako et al. | |
| 6,041,913 A | 3/2000 | Dolan | |
| 6,056,112 A | 5/2000 | Wiggins | |
| 6,076,656 A | 6/2000 | Mat | |
| 6,082,524 A | 7/2000 | Brink | |
| 6,152,290 A | 11/2000 | Mott et al. | |
| 6,179,114 B1 | 1/2001 | Brink | |
| 6,279,727 B1 | 8/2001 | Waalkes et al. | |
| 6,283,274 B1 | 9/2001 | Dolan | |
| 6,296,105 B1 | 10/2001 | Carnes | |
| 6,315,105 B1 | 11/2001 | Gibbs et al. | |
| 6,321,901 B1 | 11/2001 | Strebel et al. | |
| 6,374,991 B1 * | 4/2002 | Swinderman | B65G 45/12 |
| | | | 198/499 |
| 6,454,080 B1 | 9/2002 | Brink | |
| 6,581,754 B2 | 6/2003 | Law | |
| 6,681,919 B1 | 1/2004 | Brink | |
| 6,749,725 B1 | 6/2004 | Isometsa et al. | |
| 6,823,983 B2 | 11/2004 | Devries | |
| 6,843,363 B2 | 1/2005 | Schwarze | |
| 6,860,378 B1 | 3/2005 | Johannsen | |
| 6,874,616 B2 * | 4/2005 | DeVries | B65G 45/16 |
| | | | 198/499 |
| 6,929,112 B2 | 8/2005 | Hall | |
| 6,991,088 B1 | 1/2006 | Smith | |
| 7,007,794 B2 | 3/2006 | Waters et al. | |
| 7,093,706 B2 | 8/2006 | Devries et al. | |
| 7,216,756 B2 | 5/2007 | Swinderman | |
| 7,240,393 B2 | 7/2007 | Shyu | |
| 7,308,980 B2 | 12/2007 | Peterson et al. | |
| 7,367,443 B2 | 5/2008 | Swinderman | |
| 7,370,750 B2 | 5/2008 | Swinderman | |
| 7,549,532 B2 * | 6/2009 | Ostman | B65G 45/16 |
| | | | 198/497 |
| 7,740,127 B2 | 6/2010 | Swinderman et al. | |
| 7,987,966 B2 | 8/2011 | Devries et al. | |
| 8,157,082 B2 | 4/2012 | Puchalla | |
| 8,167,114 B2 | 5/2012 | Khanania | |
| 8,205,741 B2 | 6/2012 | Swinderman | |
| 8,245,836 B2 | 8/2012 | Kotze | |
| 8,312,986 B2 | 11/2012 | Devries et al. | |
| 8,393,459 B2 | 3/2013 | Childs | |
| 8,485,344 B1 | 7/2013 | Liland | |
| 8,602,205 B2 | 12/2013 | Yoshizako et al. | |
| 8,640,856 B2 | 2/2014 | Devries et al. | |
| 8,662,283 B2 | 3/2014 | Zieger | |
| 8,757,360 B2 | 6/2014 | Kuiper et al. | |
| 9,085,419 B2 | 7/2015 | Kuiper et al. | |
| 9,090,405 B2 | 7/2015 | Devries et al. | |
| 9,169,081 B1 | 10/2015 | Harrison et al. | |
| 9,376,264 B1 | 6/2016 | Foley | |
| 9,580,251 B2 | 2/2017 | Krosschell | |
| 10,836,585 B2 | 11/2020 | Devries | |
| 2002/0079196 A1 | 6/2002 | Law | |
| 2003/0066738 A1 * | 4/2003 | Veenhof | B65G 45/16 |
| | | | 198/497 |
| 2004/0134757 A1 * | 7/2004 | DeVries | B65G 45/16 |
| | | | 198/497 |
| 2005/0121294 A1 | 6/2005 | Finger | |
| 2005/0247543 A1 * | 11/2005 | DeVries | B65G 45/16 |
| | | | 198/499 |
| 2006/0131136 A1 | 6/2006 | Smith et al. | |
| 2008/0017479 A1 | 1/2008 | Ostman | |
| 2008/0023298 A1 * | 1/2008 | Davidts | B65G 45/16 |
| | | | 198/495 |
| 2008/0251358 A1 | 10/2008 | Thew | |
| 2009/0173599 A1 | 7/2009 | Khanania | |
| 2010/0000842 A1 | 1/2010 | Devries et al. | |
| 2011/0192705 A1 | 8/2011 | Kotze | |
| 2011/0203904 A1 | 8/2011 | Kuiper et al. | |
| 2012/0305366 A1 * | 12/2012 | Yoshizako | B65G 45/12 |
| | | | 198/499 |
| 2012/0305367 A1 | 12/2012 | Wilfried | |
| 2013/0026008 A1 | 1/2013 | Childs | |
| 2013/0175743 A1 | 7/2013 | Gibbs et al. | |
| 2013/0206546 A1 * | 8/2013 | Puchalla | B65G 45/12 |
| | | | 198/499 |
| 2014/0238822 A1 | 8/2014 | Smith | |
| 2015/0360880 A1 * | 12/2015 | Krosschell | B65G 45/16 |
| | | | 29/428 |
| 2016/0001982 A1 * | 1/2016 | Krosschell | B65G 45/16 |
| | | | 198/499 |
| 2019/0248598 A1 | 8/2019 | Fransson | |
| 2022/0033192 A1 * | 2/2022 | Weimann | B65G 45/16 |

(56)                    References Cited

U.S. PATENT DOCUMENTS

| | | |
|---|---|---|
| 2022/0396432 A1 | 12/2022 | Snow |
| 2024/0253909 A1* | 8/2024 | Kim ..................... B65G 45/16 |

FOREIGN PATENT DOCUMENTS

| | | |
|---|---|---|
| DE | 2942268 | 2/1981 |
| DE | 3402407 | 7/1985 |
| DE | 3908873 | 11/1989 |
| EP | 0254977 | 2/1988 |
| FR | 2590243 | 5/1987 |
| GB | 2125357 | 3/1984 |
| GB | 2165200 | 4/1986 |
| GB | 2221887 | 2/1990 |
| GB | 2290276 | 12/1995 |
| JP | S4734980 U | 10/1972 |
| JP | S5978318 U | 5/1984 |
| JP | H0581125 U | 11/1993 |
| KR | 101027430 | 4/2011 |
| WO | 9714635 | 4/1997 |
| WO | 0078650 | 12/2000 |
| WO | 2022261444 | 12/2022 |

OTHER PUBLICATIONS

Hosch, Hosch Sprung Blade Scrapers, Type C1V, Hosch Company, 2007, 2 pages.
Martin, Reversing Mount Tensioners Operator's Manual, Martin Engineering 1996, 1998, Aug. 1999, 30 pages.
Invitation to Pay Additional Fees and, Where Applicable, Protest Fee, for PCT/US2023/017128, mailing date May 22, 2023, 3 pages.
Martin Orion Belt Cleaning System—Orion-2000 and H20-4000 Belt Cleaners Operator's Manual M3702 (2005, 2009) (42 pages).
Martin Orion Belt Cleaning System—Belt Cleaners, Form No. L3719-07/08 (2005, 2008) (2 pages).
Martin Orion Belt Cleaning Systems—Orion-2000 Secondary Cleaner. Form No. L3709-06/08 (2005, 2008) (2 pages).
Machine English translation of webpage showing Martin Engineering in Line XHD Primary Scraper, believed to be publically available at least as early as Dec. 18, 2018: https://www.martin-eng.com.br/content/product/4011/raspador-primario-inline-xhd.
International Search Report and Written Opinion for PCT/US2023/017128, mailing date Aug. 21, 2023, 14 pages.

\* cited by examiner

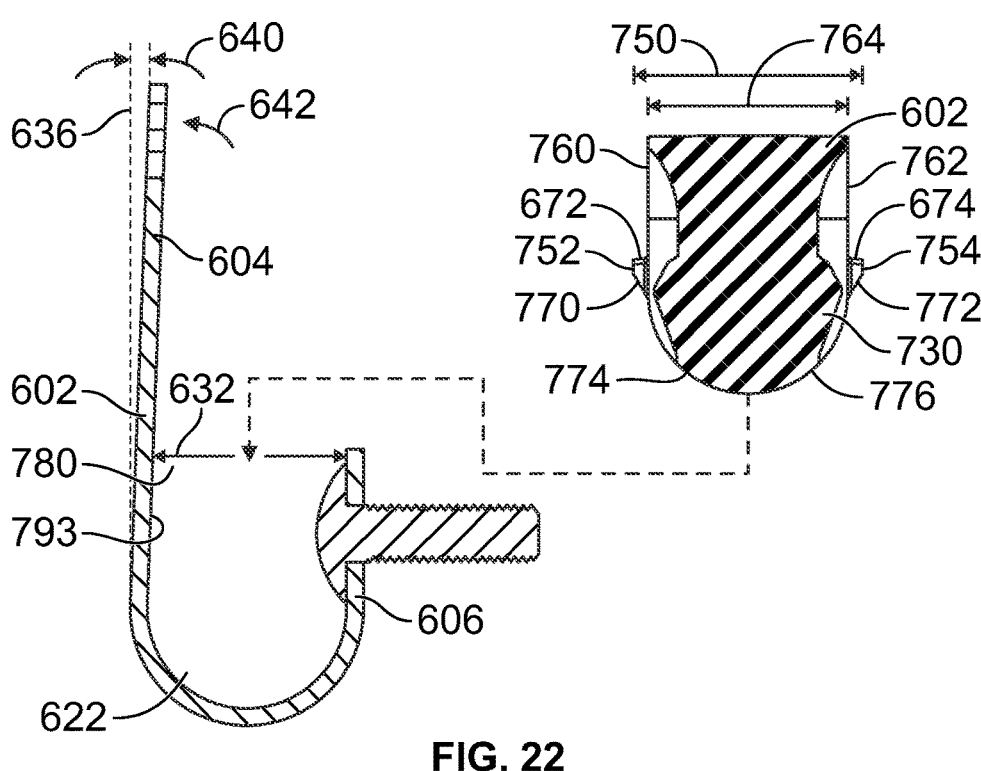
FIG. 22
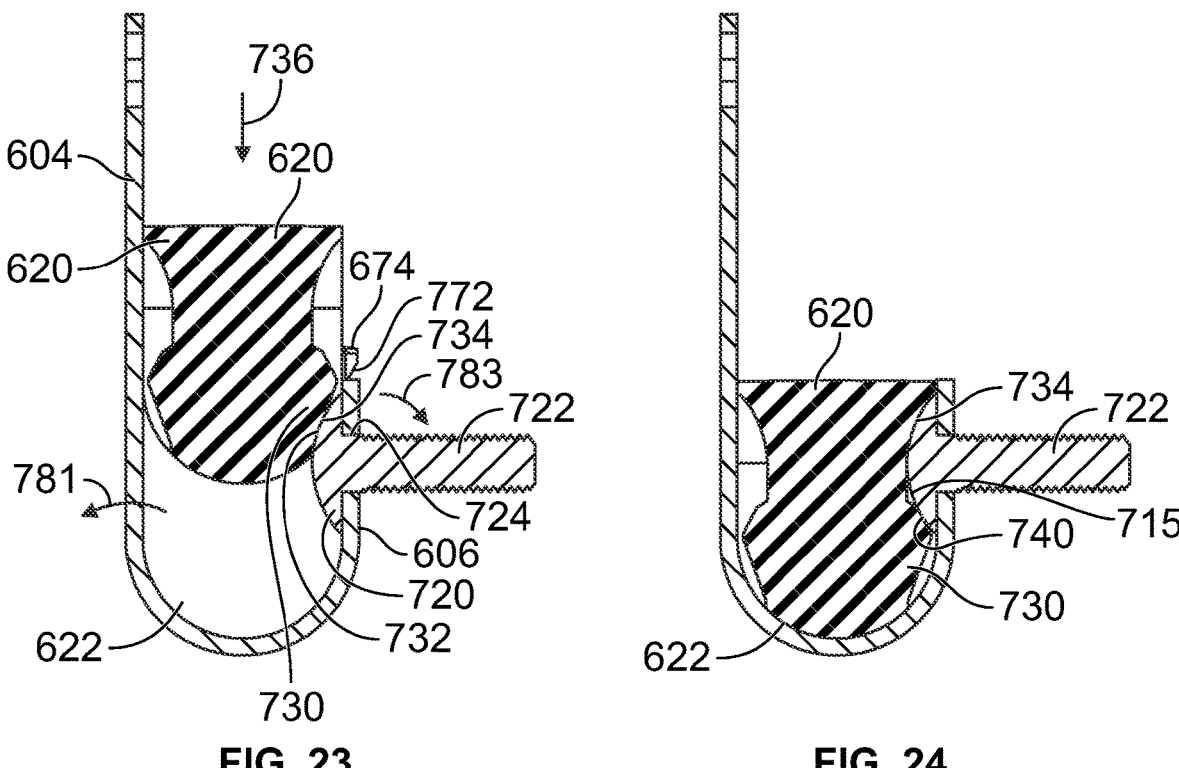
FIG. 23          FIG. 24

CONVEYOR BELT CLEANER SCRAPER BLADE MOUNT

CROSS-REFERENCE TO RELATED APPLICATION

This application claims the benefit of U.S. Provisional Patent Application No. 63/326,691 filed Apr. 1, 2022, which is hereby incorporated by reference.

FIELD

This disclosure relates to conveyor belt cleaners and, more specifically, to conveyor belt cleaners that utilize resilient blade mounts to support scraper blades in engagement with a conveyor belt.

BACKGROUND

Conveyor belt cleaners are used to remove material from a conveyor belt. One type of conveyor belt cleaner utilizes several scraper blades that are individually mounted to cushions. The cushions are, in turn, mounted to a support pole that extends laterally across the conveyor belt. At the ends of the pole, the conveyor belt cleaner has mounts that provide a rigid or a resilient support for the pole depending on the particular application. The mounts are configured to position the pole so that the scraper blades are engaged with the belt. The cushions permit the scraper blades to resiliently deflect away from the conveyor belt in response to encountering an irregularity of the conveyor belt, such as a splice or a tear in the belt.

One type of conveyor belt cleaner cushion utilizes two metal plates with a shaped rubber pad in between the metal plates. The metal plates include a first metal plate that is secured to a pole of a conveyor belt cleaner and a second metal plate to which a scraper blade is secured. The rubber pad resiliently joins the metal plates and permits movement of the second metal plate relative to the first metal plate. Specifically, the rubber pad deflects to permit the second metal plate and scraper blade thereon to move relative to the first metal plate when the scraper blade encounters a conveyor belt irregularity.

During assembly of the conveyor belt cleaner cushion, the rubber pad is chemically bonded to surfaces of the metal plates. The surface bonding interface between the rubber pad and the metal plates experiences shear, compression, tension, and peeling stresses during operation of the conveyor belt as an associated scraper blade engages the belt and is intermittently impacted by irregularities in the conveyor belt. If the bond between the rubber and one of metal plates fails during conveyor belt operation, the scraper blade supported by the metal plate is no longer able to clean the associated section of the conveyor belt. Further, failure of the bond between the rubber and metal plate may cause a scraper blade supported by the metal plate to fall onto a downstream conveyor system that receives conveyed material from the conveyor belt thereby becoming a hazard to the downstream conveyor system.

With proper process control, the bond between the rubber pad and the metal plates can remain functional for a serviceable length of time. However, the bond between the rubber pad and the metal plates is susceptible to failure due to corrosion of the metal plates, excessive deflection or compression of the rubber pads, and high cycle fatigue loading. The bonding between the rubber and the metal plates may also be compromised by insufficient process control that appears compliant but cannot be detected without destructive testing.

Further, the conventional conveyor belt cleaner cushion having metal plates joined by a rubber pad was developed several decades ago when many conveyors operated at slower speeds and had smaller diameter pulleys. As belt speeds have increased and pulley diameters have increased to provide larger capacity conveyors, the strength and durability needs of conveyor belt cleaner cushions have also increased. The strength of the rubber-to-metal bond of the conventional conveyor belt cleaner cushion is insufficient to provide long-term service and optimal tension in some heavy-duty applications, such as mining, because the inherent properties of the chemical bond between rubber and metallic plates limits the durability of a cushion relying on such a bond. Further, simply scaling up a conventional cushion to provide higher strength for heavy-duty applications is impractical due to space constraints in many environments.

SUMMARY

In accordance with one aspect of the present disclosure, a scraper blade mount for a conveyor belt cleaner is provided that includes a resilient, unitary blade mount member. The unitary blade mount member has an upwardly extending blade support portion configured to have a scraper blade mounted thereto and an upwardly extending base portion configured to be fixed to an elongate support of a conveyor belt cleaner. The blade mount member has a lower arcuate portion connecting the base portion and the blade support portion and a pocket between the blade support portion and the base portion to provide a spacing therebetween. The arcuate portion of the blade mount member permits movement of the cleaner blade support portion relative to the base portion during operation of the conveyor belt cleaner. The scraper blade mount further includes a blocker connected to the blade mount member configured to limit debris from entering an upwardly facing opening of the pocket and accumulating in the pocket. The debris may be material removed from a conveyor belt or environmental debris, such as dust or dirt. The blocker improves the durability of the scraper blade mount by limiting debris from becoming lodged in the pocket and inhibiting movement of the blade support portion relative to the base portion.

The present disclosure is also directed to a scraper blade mount having a resilient, unitary blade mount member with a blade support plate portion configured for operatively moving a scraper blade connected thereto. The blade mount member also has a base plate portion configured for being secured to an elongate support of a conveyor belt cleaner. In one embodiment, at least one of the blade support plate portion and the base plate portion is substantially flat. It is intended that the term substantially flat encompass planar configurations as well as planar configurations with minor protrusions, such as bosses, channels, and ridges that have a height of 300% or less of the thickness of the material forming the base mount member. For example, the blade support plate portion may include ridges to increase the rigidity of the blade support plate portion or a step profile to provide a recess to receive a scraper blade. Substantially flat is also intended to encompass some curvature in the blade support plate portion and/or base plate portion such as up to five degrees geometric deviation from planar.

The blade support plate portion and base plate portion extend substantially parallel to one another in an undeflected orientation of the blade support plate portion. The substantially parallel orientation of the blade support plate portion and the base plate portion permits the blade mount to be retrofit into conveyor belt cleaners that utilize conventional cleaner cushions having parallel metal plates joined by a rubber pad. It is intended that the term substantially parallel when used herein with reference to the blade support plate portion and the base plate portion encompasses orientations of the blade support plate portion and base plate portion that are parallel as well as orientations wherein the plate portions extend transverse to one another +/−3° from parallel.

The blade mount member further includes an arcuate portion interconnecting the blade support plate portion and the base plate portion so that the blade support blade portion has an inner surface that faces an inner surface of the base plate portion. The arcuate portion of the blade mount member permits resilient deflection of the blade support member portion relative to the base plate portion during conveyor belt cleaner operation. In this manner, the arcuate portion of the blade mount member provides a resilient connection between the blade support plate portion and the base plate portion. The arcuate portion of the blade mount member may thereby transfer impact loads from the blade support plate portion to the base plate portion without relying exclusively on a chemical bond between a rubber pad and metal plates for this purpose as in conventional cushions. The arcuate portion of the blade mount also reduces stress concentrations in the blade mount member when resiliently flexing the blade support plate portion toward the base plate portion. Further, the substantially parallel orientation of the blade support plate portion and the base plate portion allows the arcuate extent of the arcuate portion to be sized to provide a spring rate that is comparable to conventional cleaner cushions while providing space to accommodate deflection of the blade support plate portion during conveyor belt operation.

A scraper blade mount is also provided that includes a unitary blade mount member of resilient metallic material, a blade support portion of the blade mount member configured for having a scraper blade connected thereto, and a base portion of the blade mount member for being secured to an elongate support. The blade mount member further includes an arcuate portion interconnecting the blade support portion and the base portion. The arcuate portion permits movement of the blade support portion toward the base portion. The scraper blade mount further includes an elastomeric member having a main body portion intermediate the blade support portion and the base portion. The main body portion of the elastomeric member is configured to be resiliently deflected with resilient movement of the blade support portion toward the base portion. The elastomeric member and the blade mount member have interlocking portions configured to inhibit separation of the elastomeric member and the blade mount member during conveyor belt cleaner operation. The interlocking portions provide a secure mechanical connection between the elastomeric member and the blade mount member over only having surface bonding between the elastomeric member and the blade mount member. Further, the secure mechanical connection allows the scraper blade mount to withstand the cyclic loading and high impacts experienced by the belt cleaner during belt operations. The number, size, and shape of the interlocking portions may be selected to provide a desired strength of the connection between the blade mount member and the elastomeric member for a particular embodiment.

In accordance with another aspect of the present disclosure, a conveyor belt cleaner is provided for cleaning a conveyor belt that travels in a longitudinal belt travel direction. The conveyor belt cleaner includes an elongate support sized to extend laterally across the conveyor belt and a mounting plate portion of the elongate support. The conveyor belt cleaner further includes a scraper blade mount comprising a resilient, unitary blade mount member, a blade support plate portion configured for having a scraper blade connected thereto, a base plate portion of the blade mount member having an opening, and an arcuate portion of the blade mount member connecting the blade support plate portion and the base plate portion. The scraper blade mount includes a fastener extending through the opening of the base plate portion of the blade mount member. The fastener protrudes from the base plate portion and is sized to extend through an opening of the mounting plate portion of the elongate support to connect the scraper blade mount to the elongate support.

The scraper blade mount further includes a resilient member intermediate the blade support plate portion and the base plate portion of the blade mount member. The resilient member is of a different material than that of the resilient blade mount member and is configured to be compressed between the blade support plate portion and the base plate portion with resilient movement of the blade support plate portion toward the base plate portion. In this manner, the arcuate portion of the blade mount member provides a primary load-bearing connection between the blade support plate portion and the base plate portion of the blade mount member. The resilient member provides a secondary, dampening function as the resilient member is deflected by movement of the blade support plate portion relative to the base plate portion. The resilient member also resists movement of the fastener relative to the base plate portion, such as turning of the fastener and/or lengthwise shifting of the fastener out of the opening of the base plate portion. The resilient member thereby keeps the fastener engaged with the base plate portion which provides a rigid construct of the fastener and the blade mount member for securing to the elongate support of the conveyor belt cleaner.

The present disclosure also provides a scraper blade mount including a unitary blade mount member of resilient metallic material. The scraper blade mount has a blade support portion for having a scraper blade connected thereto, a base portion for being secured to an elongate support, and an arcuate portion interconnecting the blade support portion and the base portion that permits movement of the blade support portion toward the base portion. The scraper blade mount has an elastomeric member assembled with the blade mount member intermediate the blade support portion and the base portion. The scraper blade mount includes a snap-fit connection of the blade mount member and the elastomeric member for securing the elastomeric member to the blade mount member and keeping the elastomeric member from separating from the blade mount member during a belt cleaning operation. The snap-fit connection facilitates manufacture of the scraper blade mount using, for example, a press machine, rather than molding the elastomeric member onto the blade mount member.

BRIEF DESCRIPTION OF THE DRAWINGS

FIG. 22 is a cross-sectional view of the scraper blade mount of FIG. 18 prior to assembly of the elastomeric member and the blade mount member showing a blade support plate portion of the blade mount member inclined to extend obliquely relative to a base plate portion of the blade mount member;

FIG. 23 is a cross-sectional view similar to FIG. 22 showing the elastomeric member being advanced into the pocket of the blade mount member, and the elastomeric member urging the inclined blade support plate portion away from the base plate portion of the blade mount member;

FIG. 24 is a view similar to FIG. 22 showing the elastomeric member seated in the pocket of the blade mount member, and the blade support plate portion deflected to a parallel orientation relative to the base plate portion of the blade mount member;

DETAILED DESCRIPTION

Figure 1:
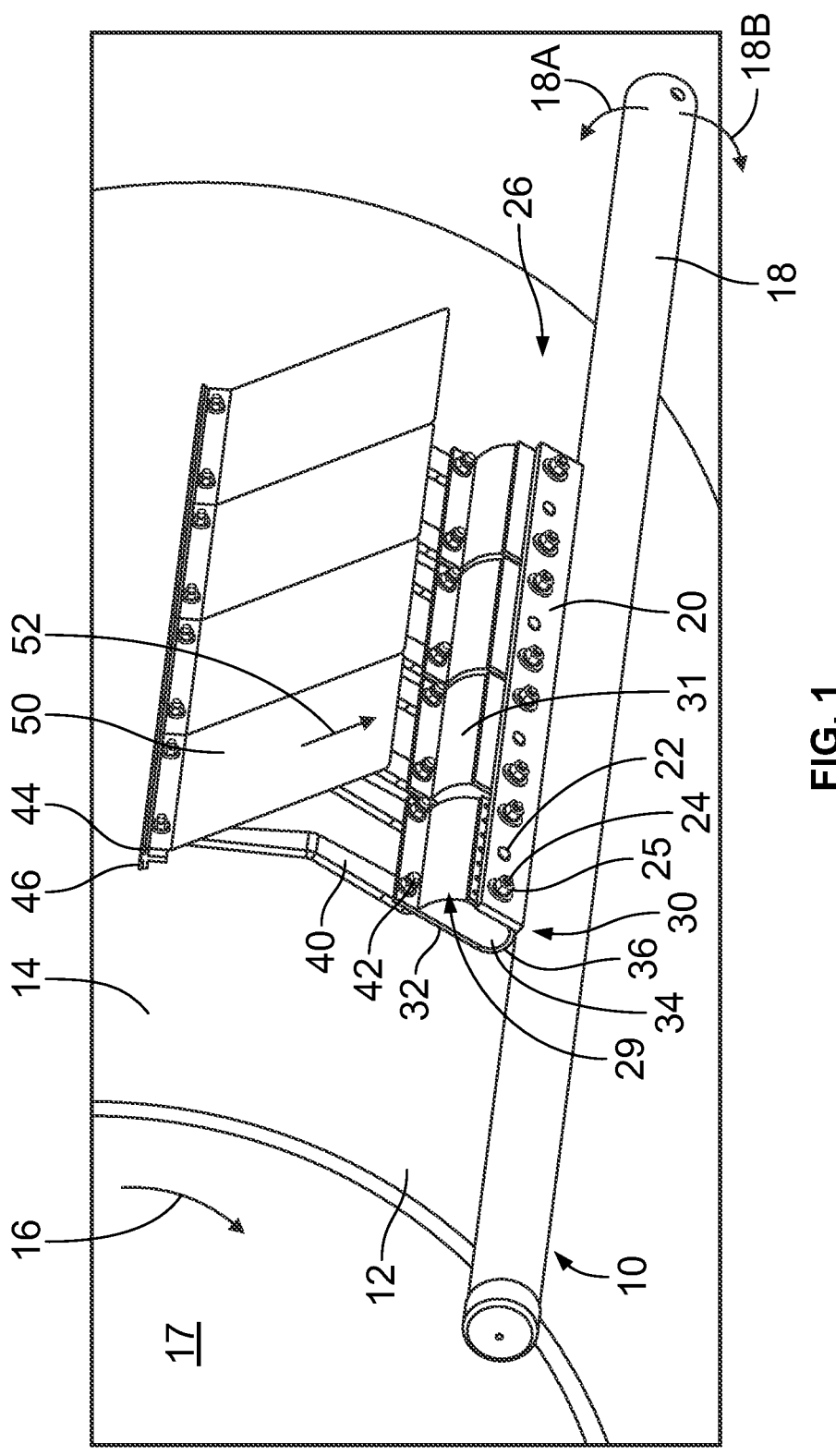
FIG. 1 is a rear perspective view of a conveyor belt cleaner including scraper blades engaged with a surface of a conveyor belt.

Regarding FIG. 1, a portion of a conveyor belt cleaner 10 is shown configured to remove material from an outer surface 12 of a conveyor belt 14 traveling in direction 16 about a head pulley 17. The conveyor belt cleaner 10 has mounts (see, e.g., mounts 302, 304 in FIG. 9) that support an elongate member, such as a pole 18, to extend laterally across the conveyor belt 14 transverse to its downstream longitudinal travel direction. The pole 18 has a bracket, such as a flange or mounting plate 20, affixed thereto such as via a weld. The mounting plate 20 has openings 22 that receive fasteners such as bolts 24 of scraper blade mounts 26. The scraper blade mounts 26 may include a scraper blade mount 30 of the subject disclosure and conventional scraper blade mounts 31.

As can be seen best in FIGS. 3-7, the scraper blade mount 30 has a blade mount member 32 with a generally J-shaped cross-section and a resilient member 33, such as elastomeric member 34, having at least a portion thereof positioned in a lower pocket 36 of the blade mount member 32. The pocket 36 has an upwardly facing opening 37 and the elastomeric member 34 has an upper portion 196 including an upper surface 200 extending across the upwardly facing opening 37.

Referring to FIG. 1, the blade mount member 32 has cleaner arms 40 connected thereto by fasteners 142. The cleaner arms 40 connect the blade mount member 32 to a scraper blade 44 having a scraping tip 46 of harder material (e.g., carbide) that engages the conveyor belt outer surface 12. In one embodiment, the conveyor belt cleaner 10 has shields 50 connected to the scraper blades. The shields 50 direct scraped material from the belt surface 12 that may otherwise fall in the blade mounts 26 down along the shields 50 generally in direction 52 away from the blade mounts 26.

In the embodiment of FIG. 1, the scraper blade mount 30 has a blocker 29 connected to the blade mount member 32. The blocker 29 is configured to limit debris from entering the upwardly facing opening 37 and accumulating in the pocket 36. The scraper blade mount 30 may be installed in a conveyor system used to convey aggregate material. The dust and particles of the aggregate that fall onto the scraper blade mount 30 could compound in the pocket 36 and limit movement of the blade mount member 32. The blocker redirects debris from entering the upwardly facing opening 37 such that the accumulation of debris in the scraper blade mount 30 is limited. In one embodiment, the blocker 29 includes the elastomeric member 34 and the shield 50. In another embodiment, the shield 50 is not used and the elastomeric member 34 operates as the blocker 29.

In one embodiment, one or more of the mounts of the conveyor belt cleaner 10 resiliently bias the pole 18 in direction 18A to engage the scraping tip 46 with the conveyor belt 14. Upon a splice of the conveyor belt 14 impacting the scraping tip 46, the scraper blade mount 30 deflects as discussed below and the mounts of the conveyor belt cleaner 10 permit the pole 18 to turn in direction 18B as the scraping tip 46 shifts away from the conveyor belt 14 into clearance with the conveyor belt splice which permits the conveyor belt splice to travel past the scraping tip 46. The one or more resilient mounts of the conveyor belt cleaner 10 resiliently urge the pole 18 in direction 18A to bring the scraping tip 46 back into engagement with the conveyor belt 14. For example, one or more of the mounts of the conveyor belt cleaner 10 may include a spring tensioner as disclosed in U.S. Pat. No. 8,662,283, which is hereby incorporated by reference in its entirety.

Figure 2:
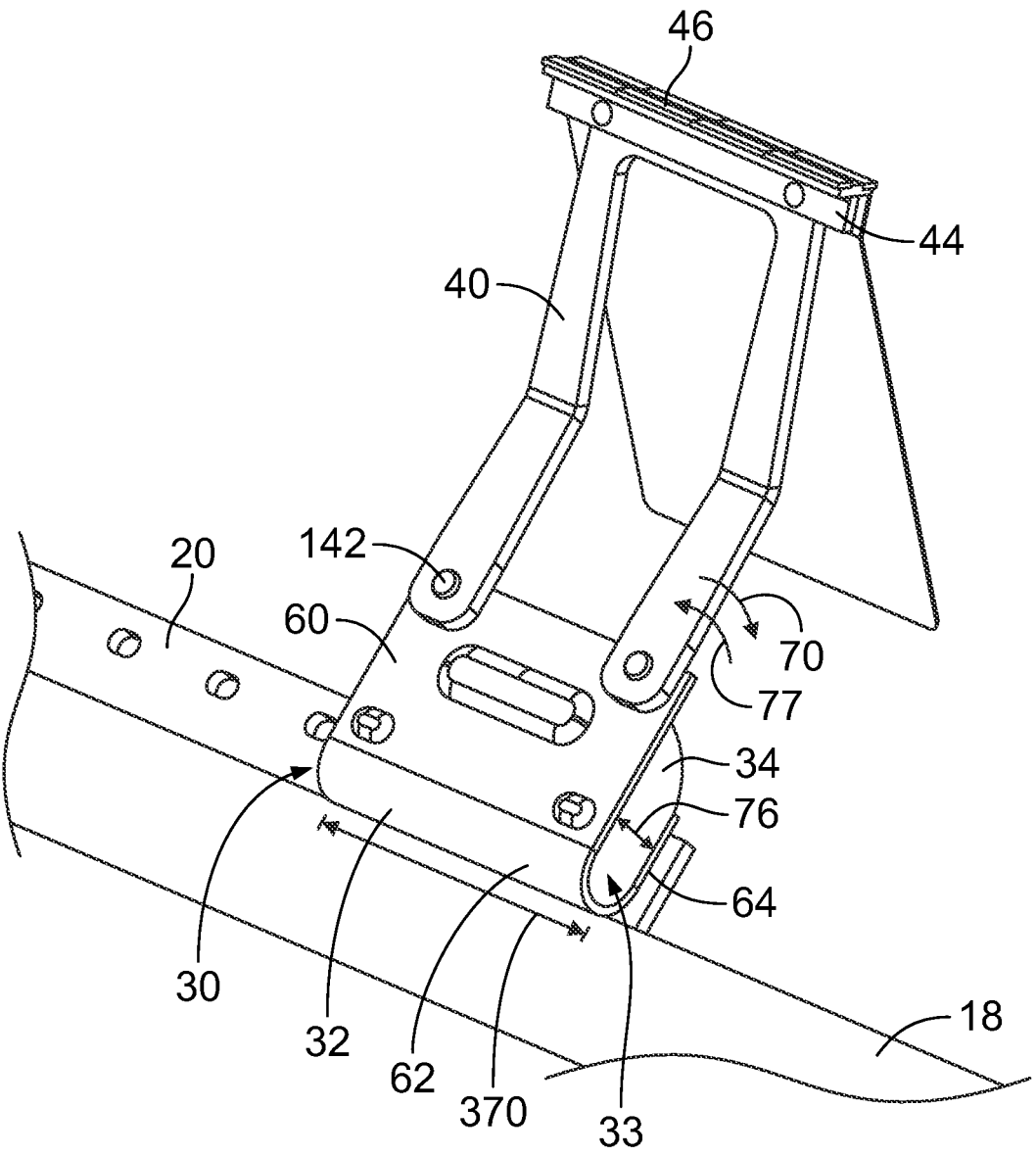
FIG. 2 is a front perspective view of a scraper blade mount of the conveyor belt cleaner of FIG. 1 showing a resilient, metallic blade mount member of the scraper blade mount secured to a mounting plate of an elongate support pole of the conveyor belt cleaner and a pair of support arms operatively connecting the scraper blade to the scraper blade mount.

Referring to FIG. 2, the blade mount member 32 has a blade support portion, such as a blade support plate portion 60, an arcuate portion 62, and a base portion, such as a base plate portion 64. In the illustrated form, the portions 60-64 are formed from a plate material so they can have the same thickness. With the illustrated J-shaped cross-section of the blade mount member 32, the blade support plate portion 60 and the base plate portion 64 both have a substantially flat configuration and extend parallel to each other. The base plate portion 64 is seated against the mounting plate 20 of the pole 18. The threaded shanks 154 (see FIG. 6) of the bolts 24 protrude from the base plate portion 64, extend through the openings 22 of the mounting plate 20, and are secured to the mounting plate 20 via nuts 25 therealong the shanks 154. The base plate portion 64 can have a footprint that is similar to the footprint of a base plate of a conventional blade mount 31 to permit the scraper blade mount 30 to be retrofit to the mounting plate 20 of an existing conveyor belt cleaner.

Impact forces against the scraping tip 46 are transferred via the cleaner arm 40 to the blade support plate portion 60 and causes the blade support plate portion 60 to pivot in direction 70 (see FIG. 2) toward the base plate portion 64. Preferably, the blade mount member 32 is of a resilient metallic material, such as a spring steel material. In this regard, the arcuate portion 62 of the blade mount member 32 operates as a primary spring that resists the movement of the blade support plate portion 60 in direction 70. The spring steel material of the blade mount member 32 can have a compression set or strain memory that is effectively zero to permit the blade mount member 32 to return the scraping tip 46 to the same initial orientation each time the scraping tip 46 impacts a conveyor belt.

Additionally, the scraper tip 46 may contact an irregularity such as a splice of the conveyor belt 12 which applies loading generally in direction 230 (see FIG. 8) against the scraping tip 46. The blade support plate 60 is oriented obliquely to the force in direction 230 such that the force in components in directions 230, 232 pivot the blade support plate portion 60 toward the base plate portion 64. The arcuate portion 62 resiliently resists pivoting of the blade support plate portion 60 relative to the base plate portion 64. The blade mount member 32 permits the blade mount 30 to have a tuned deflection spring rate via the geometry of the actuate portion 62 which can be selected to provide a desired spring rate as discussed in greater detail below. Further, because the arcuate portion 62 interconnects the blade support plate portion 60 and the base plate portion 64, the metallic material of the blade mount member 32 transfers forces from the scraper blade 44 to the pole 18 rather than relying on a metallic-elastomer bond to carry shear, normal, and peeling stresses as in conventional cushions.

Figures 3, 4:
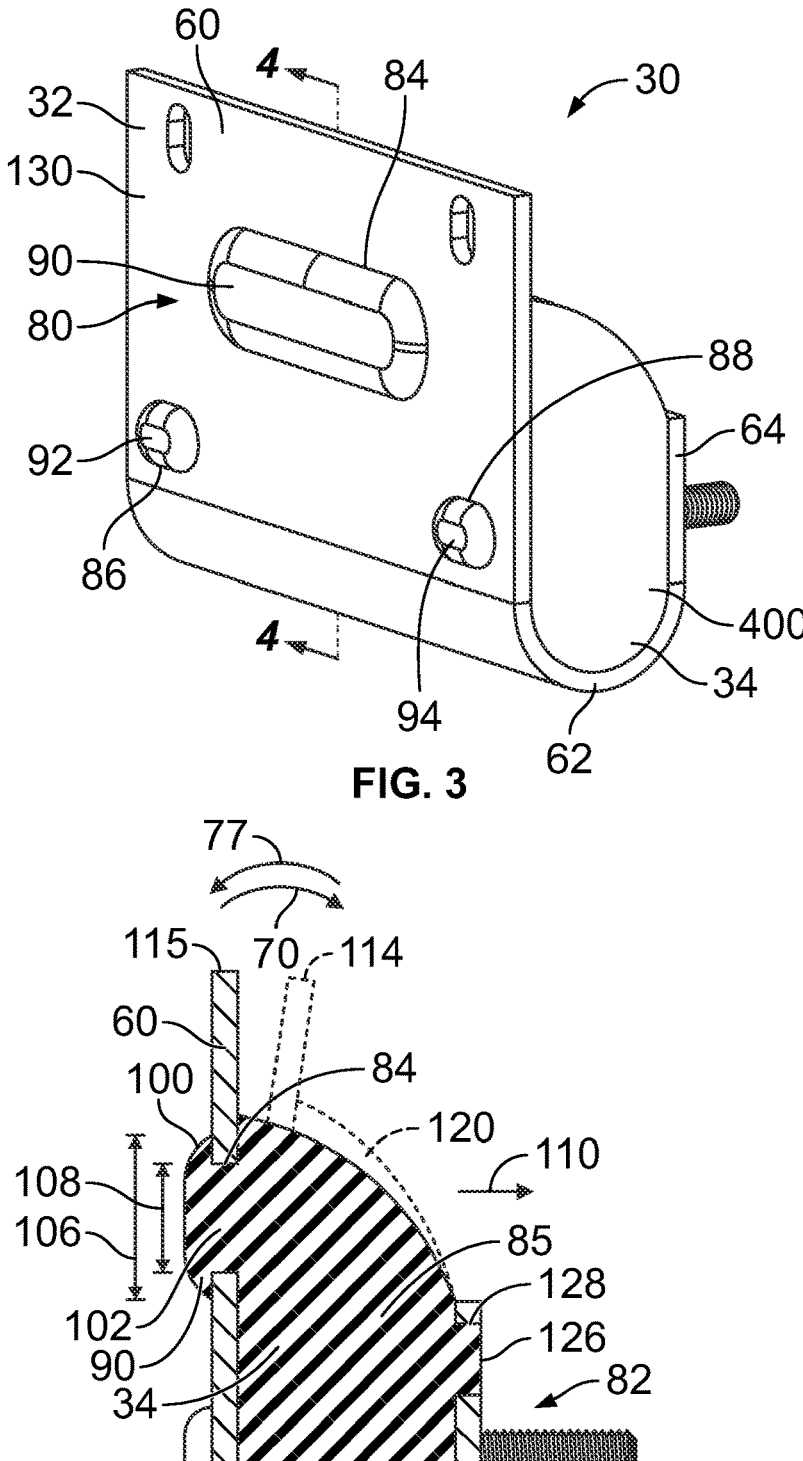
FIG. 3 is a front perspective view of the scraper blade mount of FIG. 2 showing different size protrusions of an elastomeric member extending through openings of a blade support plate portion of the blade mount member with the elastomeric member in a pocket formed between the blade support portion and a base plate portion.
FIG. 4 is a cross-sectional view taken along line 4-4 of FIG. 3 showing an enlarged head portion of the upper protrusion, a main body portion of the elastomeric member in the pocket between the blade support portion and the base plate portion, and a neck portion of the elastomeric member extending in the opening of the blade support plate portion between the enlarged head portion and the main body portion of the elastomeric member to form a mechanical interlock between the elastomeric member and the metallic blade mount member.

The elastomeric member 34 operates as a secondary spring member to resist narrowing of the distance 76 (see FIG. 2) between the blade support plate portion 60 and the base plate portion 64 when the blade support plate portion 60 has been shifted to a deflected position 114, as depicted in FIG. 4. The elastomeric member 34 thereby applies a resilient restorative force against the blade support plate portion 60 to urge the blade support plate portion 60 in direction 77 back toward the initial, undeflected position 115 thereof. Still further, the elastomeric member 34 has dampening characteristics that absorb vibrational energy generated by the scraping tip 46 engaged with the conveyor belt which dampens the movement of the blade support plate portion 60 and limits chatter of the scraping tip 46.

Figure 5:
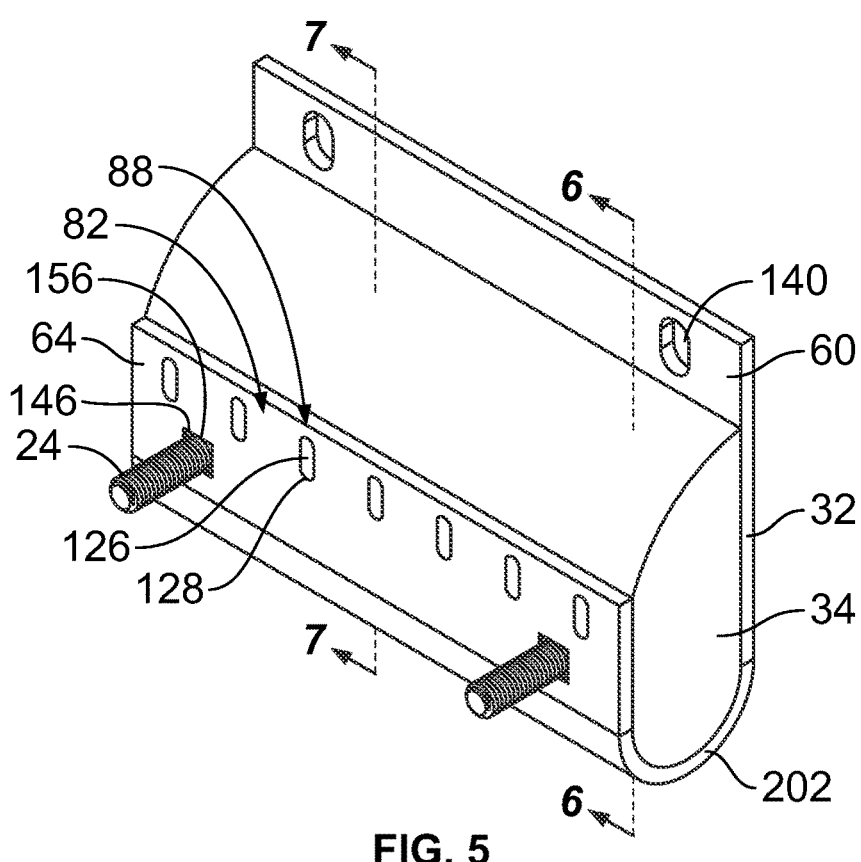
FIG. 5 is a rear perspective view of the scraper blade mount of FIG. 3 showing fasteners protruding through openings of the base plate portion of the blade mount member for extending through openings of the mounting plate fixed to the elongate support pole shown in FIG. 2.

Referring to FIGS. 3 and 5, the scraper blade mount 30 has interlocking portions 80 of the blade support plate portion 60 and elastomeric member 34 as well as interlocking portions 82 of the base plate portion 64 and the elastomeric member 34. As shown in FIG. 3, the interlocking portions 80 include upper opening 84, lower opening 86, and lower opening 88 of the blade support plate portion 60 and large upper protrusion 90, smaller lower protrusion 92, and smaller lower protrusion 94 of the elastomeric member 34. The upper protrusion 90, lower protrusion 92, and lower protrusion 94 are oversized bosses formed on an outer surface 130 of the blade support plate portion 60 and are larger across the blade support plate portion 60 than, respectively, the upper opening 84, lower opening 86, and lower opening 88. In this manner, the elastomeric member 34 is mechanically anchored to the blade support plate portion 60.

More specifically and with reference to FIG. 4, the upper protrusion 90 has an enlarged end portion, such as a head 100, outside of the pocket 36 of the blade mount member 32 and formed on an outer surface 130 of the blade support plate portion 60 and a neck portion 102 extending through the upper opening 84 from a main body 85 of the elastomeric member 34 in the pocket 36. The head portion 100 has an enlarged dimension 106 greater than a smaller dimension 108 across the upper opening 84. The head 100 anchors the elastomeric member 34 to the blade support plate portion 60 and inhibits pull-through of the upper protrusion 90 in inward direction 110 through the upper opening 84. The lower protrusions 92, 94 have similar enlarged end portions and narrowed neck portions that mechanically anchor the elastomeric member 34 to the blade support plate portion 60.

Continuing reference to FIG. 4, when the scraping tip 46 engages a conveyor belt irregularity, such as a metallic fastener of a conveyor belt splice, the impact force will cause the scraping tip 40 to shift away from the belt surface 12 which moves the cleaner arm 40 therewith which urges the blade support plate portion 60 generally in direction 70 to a deflected position 114 to allow the splice to pass without damaging the scraping tip 46. The deflection of the blade support plate portion 60 in direction 70 compresses the elastomeric member 34 between the blade support plate portion 60, the arcuate portion 62, and the base plate portion 64 which causes the body 104 of the elastomeric member 34 to bulge upward as shown by bulged portion 120. The compressed elastomeric member 34 and the arcuate portion 62 of the blade mount member 32 resiliently urge the blade support plate portion 60 back toward the initial, undeflected position 115 in direction 77. Further, the head portion 100 resists pull-through of the upper protrusion 90 and keeps the upper protrusion 90 secured to the blade support plate portion 60 so as to be in flush engagement therewith in the pocket 36.

In some situations, the blade support plate portion 60 may move or rebound in direction 77 beyond the initial, undeflected position 115 such as due to scraping tip 46 impacting a damaged splice. The pole 18 may have turned in direction 18B due to the impact and the scraping tip 46 is temporarily out of contact with the conveyor belt 14 such that the rebounding blade mount member 32 and elastomeric member 34 may cause the blade support plate portion 60 to over-travel beyond the initial, undeflected position 115. However, due to the interfering configuration of the head portion 100 of the elastomeric member 34 with respect to the upper opening 84 through which the protrusion 90 extends, the neck portion 102 is tensioned and resiliently urges the blade support plate portion 60 back toward the initial, undeflected position 115 in direction 70. The scraping tip 46 may then re-engage the conveyor belt 14 with the blade support plate portion 60 substantially in the initial, undeflected position 115 as the pole 18 turns in direction 18A once the damaged splice has traveled past the conveyor belt cleaner 10.

With reference to FIG. 4, the elastomeric member 34 may be formed so that a portion of the elastomeric member 34, such as upper portion 85, may be in tension when the blade support plate portion 60 is in the initial, undeflected position 115. The tensioned upper portion 85 of the elastomeric member 34 applies a tensile force on the upper protrusion 90 in direction 110.

Referring to FIG. 5, the interlocking portions 82 of the base plate portion 64 and the elastomeric member 34 include protrusions 126 of the elastomeric member 34 and openings 128 of the base plate portion 64. The engaged protrusions 126 and openings 128 resist movement of the elastomeric member 34 away from the base plate portion 64. Further, the openings 128 provide additional surface area therein for bonding with the elastomeric member 34.

During installation of the conveyor belt cleaner 10, the pole 18 may be adjusted so that the scraping tips 46 are firmly engaged with the conveyor belt outer surface 12 and the blade support plate portion 60 is deflected slightly in direction 70 to apply a preload to the blade mount member 32 and the elastomeric member 34. The preload in the blade mount member 32 and the elastomeric member 34 causes the scraper blade mount 30 to resiliently bias the scraping tip 46 into engagement with the conveyor belt surface 12 during conveyor belt operations.

As has been discussed, the blade mount member 32 is preferably of a metallic material, such as steel, stainless spring steel, or aluminum, that is stamped or otherwise processed from a flat sheet or plate of metallic material to have the desired shape of the blade mount member 32. As noted above, the resilient member 33 may be an elastomeric member 34. The elastomeric member 34 may be, for example, synthetic rubber, natural rubber, polyurethane, and/or a high temperature resistant silicone. As another example, the resilient member 33 may be a closed-cell or open-cell foam. In another approach, the resilient member 33 may be a liquid filled bladder with an extensible membrane.

The manufacture of the blade mount 30 may include, for example, positioning the blade mount member 32 into a mold and molding the elastomeric member 34 in situ onto the blade mount member 32. The in situ forming of the elastomeric member may result in surface bonding between the elastomeric member 34 and the blade mount member 32. In one approach, a bonding agent such as an adhesion promoting agent may be applied to the blade mount member 32 prior to molding to encourage a chemical bonding between the elastomeric member 34 and the blade mount member 32. The surface bonding between the elastomeric member 34 and the blade mount member 32 is a secondary attachment mechanism between the elastomeric member 34 and the blade mount member 32. By contrast, the primary attachment mechanism is provided by the previously described interlocking portions 80, 82 which mechanically secure the elastomeric member 34 and the blade mount member 32. In this manner, the bonding between the elastomeric member 34 and the blade mount member 32 is less important from a design and manufacturing perspective. Further, the arcuate portion 62 of the blade mount member 32 transfers forces from the blade support plate portion 60 to the base plate portion 64 which eliminates the need for the surface bonding between the elastomeric member 34 and the blade mount member 32 to carry shear, normal, and peeling stresses imparted to the scraper blade mount 30 during conveyor belt cleaner operations.

Figure 6:
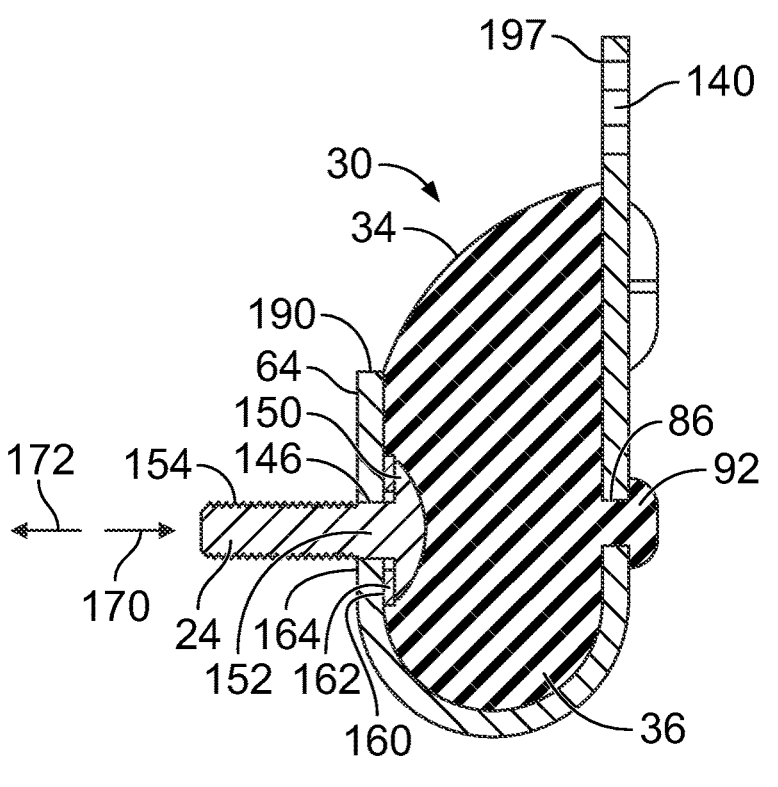
FIG. 6 is a cross-sectional view taken across line 6-6 in FIG. 5 showing a lower protrusion of the elastomeric member extending through a lower opening of the blade support plate portion and a polygonal neck portion of the fastener engaged in a polygonal fastener opening of the base plate portion.

Referring to FIG. 5, the blade support plate portion 60 has one or more openings 140 to receive fasteners 142 for securing the cleaner arm 40 of FIG. 2 thereto. The blade mount member 32 operatively mounts the scraper blade 44, which is directly secured to the cleaner arm 40 at or near the upper end thereof, to the mounting plate 20 of the cleaner pole 18. The base plate portion 64 has fastener openings 146 configured to receive the bolts 24. With reference to FIG. 6, the bolts 24 may be carriage bolts having a head portion 150, a square neck portion 152, and the threaded shank 154 extending from the neck portion 152. The fastener openings 146 may each have a square configuration slightly larger than the square neck portion 152 to position the square neck portion 152. The mating engagement between the non-circular cross-sections of the neck portion 152 and the fastener opening 146 inhibit rotary movement of the bolt 24 relative to the base plate portion 64. More specifically, the neck portion 152 has flats that contact straight surfaces 156 extending about the square fastener opening 146. The abutting contact between the flats of the neck portion 152 of the bolt 24 and the straight surfaces 156 of the blade mount member 32 resist turning of the bolt 24 relative to the blade mount member 32. The fastener opening 146 and neck portion 152 may have non-circular configurations such as the above-described square configuration but also triangular, octagonal, obround, or elliptical, as some examples.

Referring to FIG. 6, the base plate portion 64 has an inner surface 160 to which the elastomeric member 34 is bonded. The blade mount 30 further includes a washer 162 in the pocket 36 that is positioned between the head portion 150 of the bolt 24 and the inner surface 160 of the base plate portion 64. The base plate portion 64 further has an outer surface 164 that may be flat to seat against the flat surface of the mounting plate 20. A threaded shank 154 of the bolt 34 projects outward from the outer surface 164 of the base plate portion 64. The projecting threaded shank 154 is readily advanced by an installer into openings 22 (see FIG. 1) of the mounting plate 20 of the pole 18.

The elastomeric member 34 is molded in situ with the blade mount member 32, the bolt 24 and the washer 162. The elastomeric member 34 covers the head portion 150 and washer 162 in the pocket 36 of the blade mount member 32. The molded elastomeric member 34 resists movement of the bolt 24 in direction 170 and the head portion 50 is larger than the fastener opening 146 to block movement of the bolt 24 in direction 172. In this manner, the elastomeric member 34 captures the bolt 24 on the base plate portion 64 and completely covers the head portion 150 of the bolt 24 in the pocket 36 to prevent against corrosion.

Figure 7:
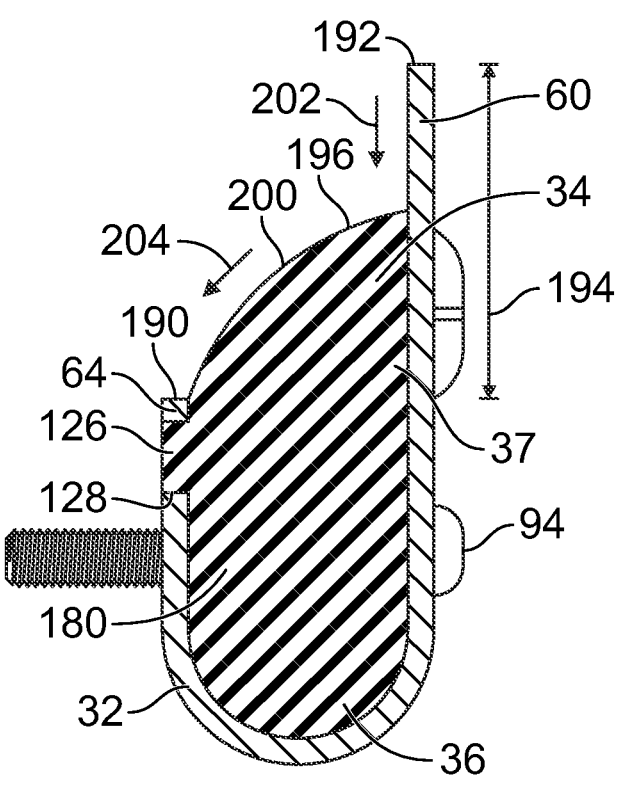
FIG. 7 is a cross-sectional view taken across line 7-7 in FIG. 5 showing a rear protrusion of the elastomeric member extending in an upper opening of the base plate portion of the blade mount member.

Referring to FIG. 7, the in situ molding of the elastomeric member 34 permits the elastomeric material of the elastomeric member 34 to flow into the openings 128 of the base plate portion 64 during molding and form the protrusions 126 extending therein. The series of engaged protrusions 126 and openings 128 resists relative movement between a rear portion 180 of the elastomeric member 34 and the base plate portion 64 as the blade support plate portion 60 shifts in directions 70 and 77 (see FIG. 4) during conveyor belt operation.

Continuing reference to FIG. 7, the base plate portion 64 has an upper free end 190 and the blade support plate portion 60 has an upper free end 192. The blade support plate portion 60 is longer than the base plate portion 64 and extends for a distance 194 beyond the free end 190 of the base plate portion 64. The elastomeric member 34 has an upper end portion 196 above the free end 190 of the base plate portion 64 and a convex outer surface 200 that extends from the blade support plate portion 60 to the base plate portion 64. The blade support plate portion 60 extends beyond the convex outer surface 200 of the elastomeric member 34 to form a free end mounting portion 197 thereof, including the openings 140 for fastening the cleaner arms 40 thereto. Further, debris removed from the conveyor belt 12 by the scraper blade 44 or that is present in the surrounding environment, such as dirt or dust, may fall generally in direction 202 on the convex outer surface 200 of the elastomer member 34. The convex outer surface 200 is configured to direct the debris generally in direction 204 off of the blade mount 30. The movement of debris in direction 204 is encouraged by vibrations from conveyor belt operation and movement of blade support plate portion 60 and associated bulging 120 (see FIG. 4) of the elastomeric member 34. In this manner, debris is more likely to roll off of the elastomeric member 34 rather than accumulating and potentially inhibiting movement of the blade support plate portion 60 relative to the base plate portion 64.

Figure 8:
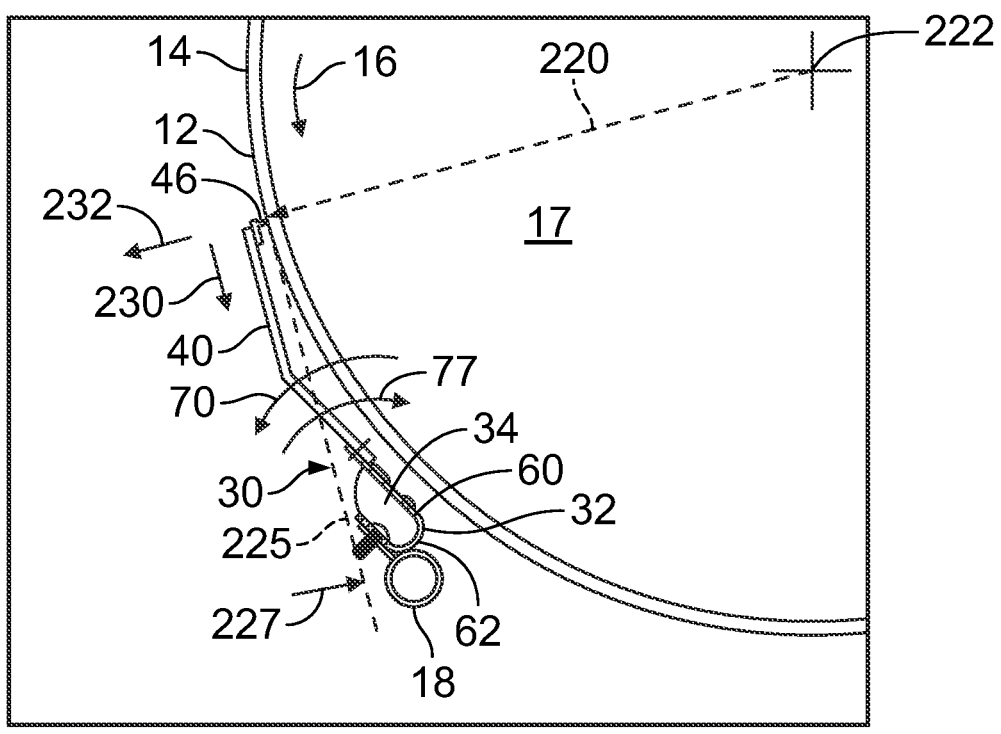
FIG. 8 is a side elevational view of the scraper blade mount fastened to the mounting plate of the support pole showing the scraper tip of the scraper blade extending normal to an outer surface of the conveyor belt as the conveyor belt extends about a head pulley.

Referring next to FIG. 8, the conveyor belt cleaner 10 including the scraper blade mount 30 is shown adjacent the head pulley 17 as a primary cleaner. As the head pulley 17 turns in direction 16, the conveyor belt 14 thereon travels in direction 16. The scraping tip 46 removes material from the outer surface 12 during conveyor belt operation. The scraper blade mount 30 and cleaner arm 40 support the scraping tip 46 to extend along the radius 220 from the center or axis 222 of rotation of the head pulley 17. Further, the scraping tip 46 extends normal to the outer surface 12 of the conveyor belt 14 so as to be perpendicular to a tangent line 225 which is at a ninety-degree angle 227 from the radius 220.

When the scraper blades 44 have been tensioned against the conveyor belt, the blade support plate portion 60 is oriented obliquely to the tangent line 225. The impact of an irregularity of the conveyor belt 14 against the scraping tip 46 imparts an impact force on the scraping tip 46 having components in a scalping or tangential direction 230 as well as a radially outward direction 232. The impact force acts upon the scraping tip 46 and causes the scraping tip 46 to urge the cleaner arm 40 in direction 70 to a deflected position. Because the scraping tip 46 is oriented normally to the conveyor surface 12 and the blade support plate portion 60 is oriented obliquely to the tangent line 225, the impact force from a conveyor belt irregularity striking the scraping tip 46 pivots the blade support plate portion 60 of the blade mount member 32. The arcuate portion 62 has portions placed in tension and compression as the blade support plate portion 60 pivots to absorb the impact force. In this manner, the blade mount member 32 is positioned to absorb the impacts from conveyor belt irregularities via compression and tension of the blade mount member 32 as a primary means for withstanding impact forces rather than relying on surface bonding between a rubber pad and metal plates as in conventional cushions.

Referring temporarily to FIG. 1, the conventional scraper blade mounts 31 are shown to illustrate the similar size of the scraper blade mount 30 and conventional scraper blade mounts 31 such that the scraper blade mount 30 is well-suited to be a replacement for a damaged conventional scraper blade mount 31. For a new installation of the conveyor belt cleaner 10, the conveyor belt cleaner 10 may be provided with two or more scraper blade mounts 30 as appropriate for the installation and no conventional scraper blade mounts 31.

Figure 9:
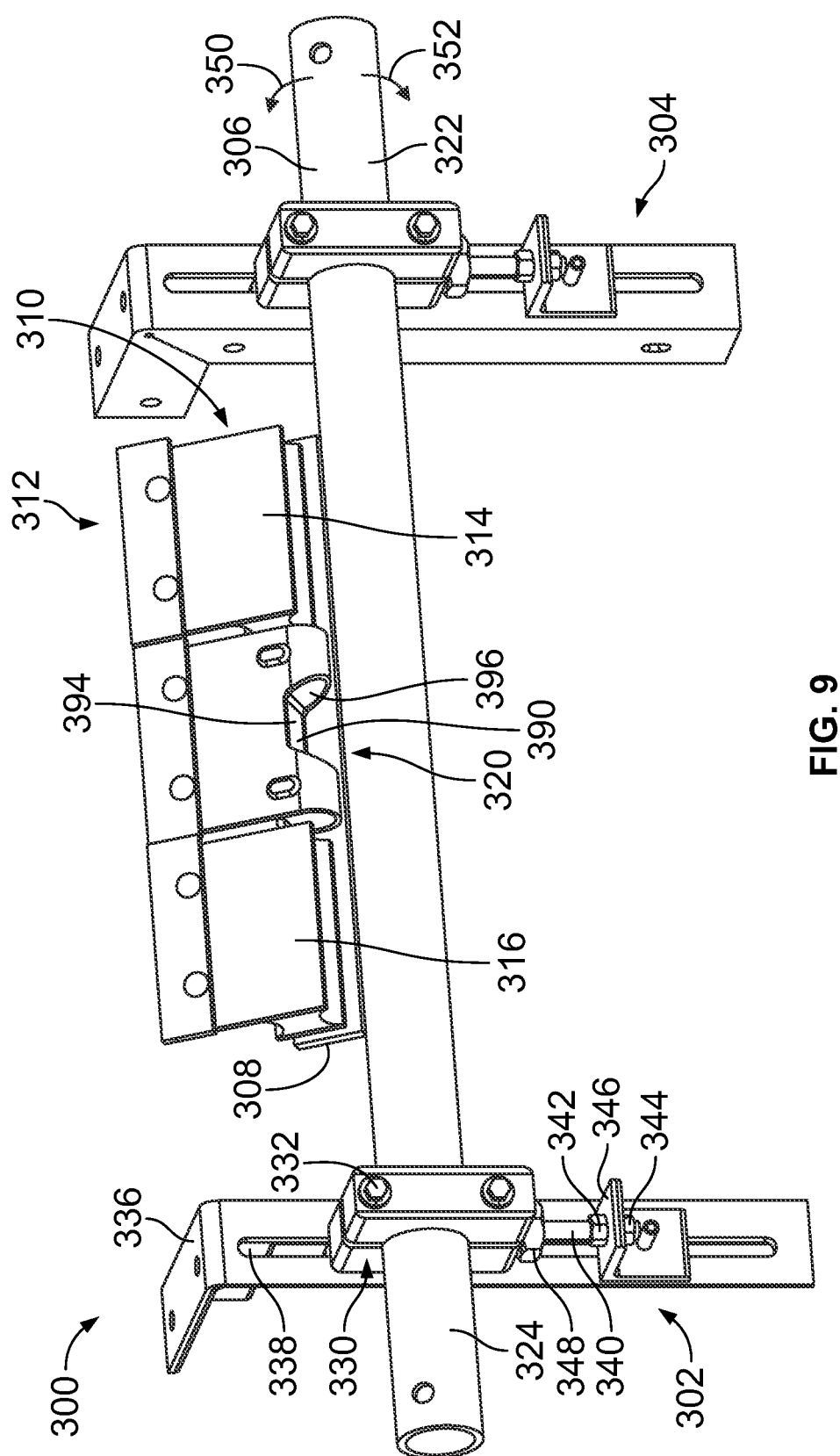
FIG. 9 is a perspective view of another conveyor belt cleaner having rigid mounts at opposite end portions of an elongate support pole and scraper blade mounts fastened to the mounting plate of the elongate pole, the scraper blade mounts having scraper blades operatively secured thereto.

Regarding FIG. 9, a belt cleaner 300 is provided that is similar in many respects to the conveyor belt cleaner 10 discussed above such that differences will be highlighted. The conveyor belt cleaner 300 includes mounts 302, 304 that support an elongate member such as a pole 306. The pole 306 has a plate 308 for supporting scraper blade mounts 310 having scraper blades 312 connected thereto. The scraper blade mounts 310 include conventional scraper blade mounts 314, 316 and scraper blade mount 320. The scraper blade mount 320 interfaces with the plate 308 in a similar manner as the scraper blade mounts 314, 316. Further, the scraper blade mount 320 is similar in size to the conventional scraper blades mounts 314, 316. The scraper blade mount 320 is thereby well-suited to be retrofit into an existing belt cleaner system. For a new installation of the belt cleaner 300, the belt cleaner 300 may be provided with two or more scraper blade mounts 320 as appropriate for the installation and no conventional scraper blade mounts 314, 316.

The plate 308 of the pole 306 may project radially from a tubular wall 322 of the pole 306. In other embodiments, the elongate support is an angle iron instead of pole 306 and the plate 308 is a leg of the angle iron to which the scraper blade mount 310 is attached. The mounts 302, 304 each include a split block 330 having fasteners 332 operable to clamp an end portion 324 of the pole 306 between halves of the respective split block 330.

The mounts 302, 304 further each include a side frame member 336 secured to a surface near the conveyor belt, such as a frame of a conveyor belt system. The side frame members 336 each have a vertical adjustment slot 338 that receives a fastener of the split block 330 such that the split block 330 and pole end portion 324 clamped therein may be vertically adjusted relative to the conveyor belt. For example, the mounts 302, 304 may each have a vertical adjustment screw 340 that is threadingly engaged with nuts 342, 344 on opposite sides of a bracket 346 and a nut 348 of the split block assembly 330. Turning the nut 348 vertically shifts the split block 330 and pole end portion 324 clamped therein.

The fasteners 332 of the split block assembly 330 may be loosened to permit the pole 306 to be turned in directions 350, 352 to position the scraper blades 312 at a desired attack angle relative to the conveyor belt surface. Once the belt cleaner 300 has been installed, the mounts 302, 304 are rigid and fix the vertical and rotary position of the pole 306 relative to the side frame members 336. In other embodiments, the conveyor belt cleaner 300 may utilize resilient mounts to provide another mechanism to absorb the forces from the conveyor belt acting on the scraper blades 312.

Figure 10:
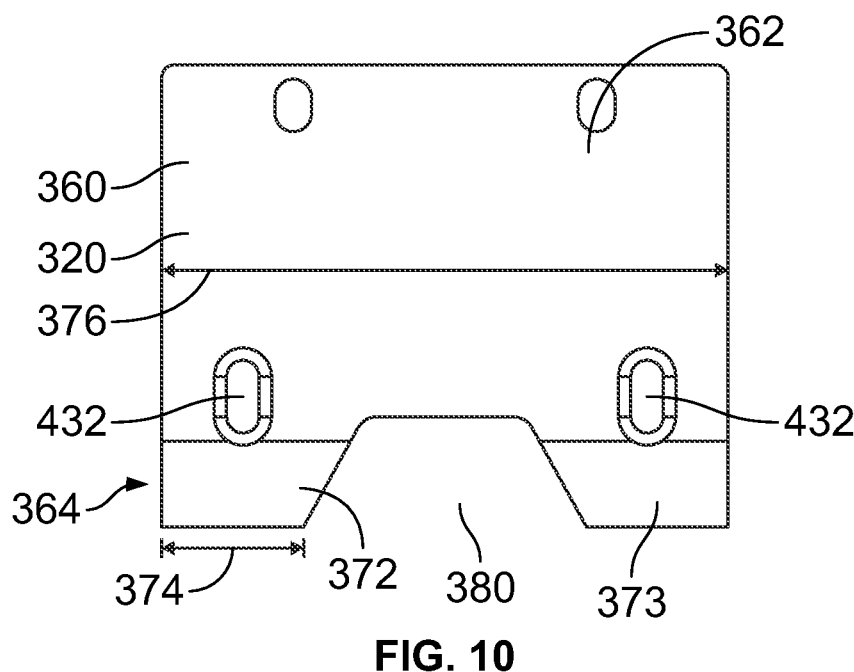
FIG. 10 is a front elevational view of the middle scraper blade mount of FIG. 9 showing a pair of spaced apart, lower loop portions of a blade mount member of the scraper blade mount.

Regarding FIG. 10, the scraper blade mount 320 has a blade mount member 360 with a blade support plate portion 362, an arcuate portion 364, and a base portion 366 (see FIG. 10). Whereas the arcuate portion 62 (see FIG. 2) has a single loop that extends an entire width 370 of the blade mount member 32, the arcuate portion 364 has a pair of loops 372 with a minimum width 374 that each are less than half the maximum width 376 of the blade mount member 360. The narrowed loops 372, 373 form a spacing 380 between the loops 372, 373. The spacing 380 causes the arcuate portion 364 to have less material to resist movement of the blade support plate portion 362 relative to the base plate portion 366. In this manner, the blade mount member 360 of the scraper blade mount 320 is less rigid than the blade mount member 32 of the scraper blade mount 30 and applies a lower spring force to return an associated scraper blade into engagement with a conveyor belt. It will be appreciated that the arcuate portion 364 of the blade mount member 360 may have a geometry selected, e.g., the spacing 380 widened or narrowed, to provide a desired spring force of the blade mount member 360.

Figure 11:
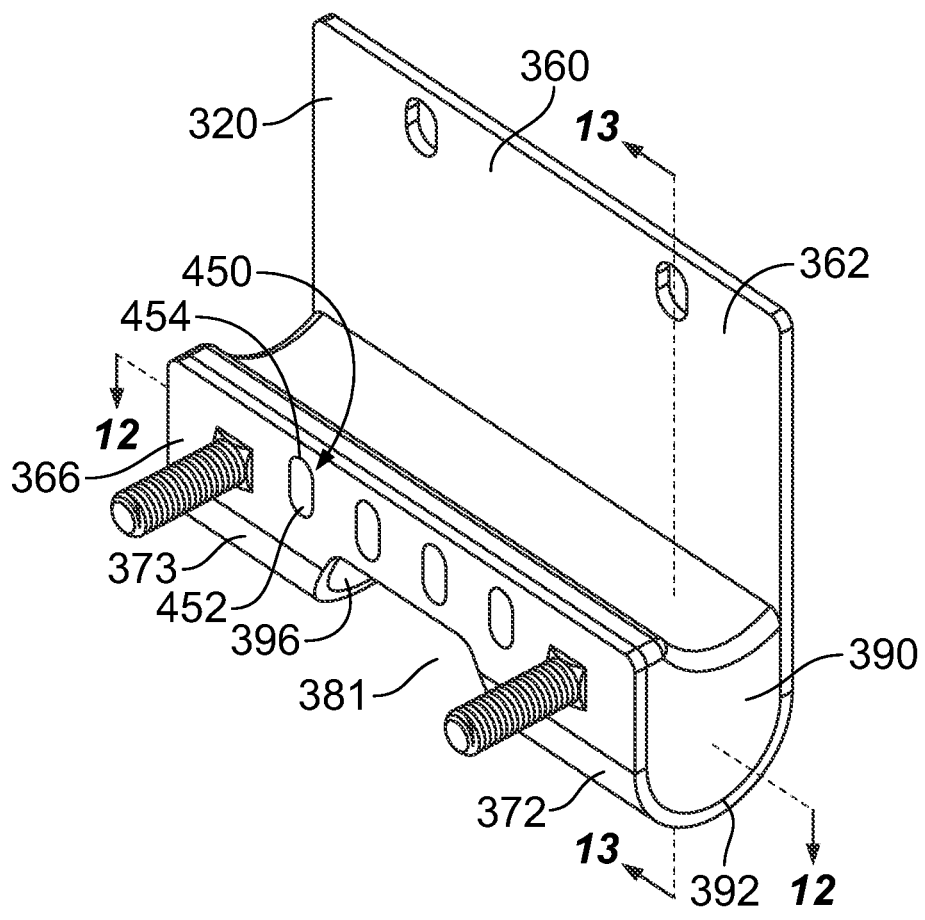
FIG. 11 is a rear perspective view of the scraper blade mount of FIG. 10 showing openings of a base plate portion of the blade mount member that receive protrusions of an elastomeric member and fasteners.

Regarding FIG. 11, the scraper blade mount 320 has an elastomeric member 390 in a pocket 392 of the blade mount member 360. The elastomeric member 390 has an upper surface 472 (see FIG. 13) covering an upwardly facing opening 473 of the blade mount member 360. Like the arcuate portion 364 of the blade mount member 360, the elastomeric member 390 has a lower notched portion 394 (see FIG. 9) including a pair of inclined side surfaces 396 that are on opposite sides of a spacing 381 of the elastomeric member 390. The reduced material of the lower notched portion 394 of the elastomeric member 390 compared to an uninterrupted lower portion 400 (see FIG. 3) of the elastomeric member 34 causes the elastomeric member 390 to have a reduced rigidity to resist movement of the blade support plate portion 362 relative to the base plate portion 366 as compared to the elastomeric member 34. In this manner, the spacing 380 at the lower end of the blade mount member 360 and the spacing 381 of the elastomeric member 390 provide a cushion rigidity of the scraper blade mount 320 that is less than the cushion rigidity of the scraper blade mount 30 of FIG. 3.

Figure 12:
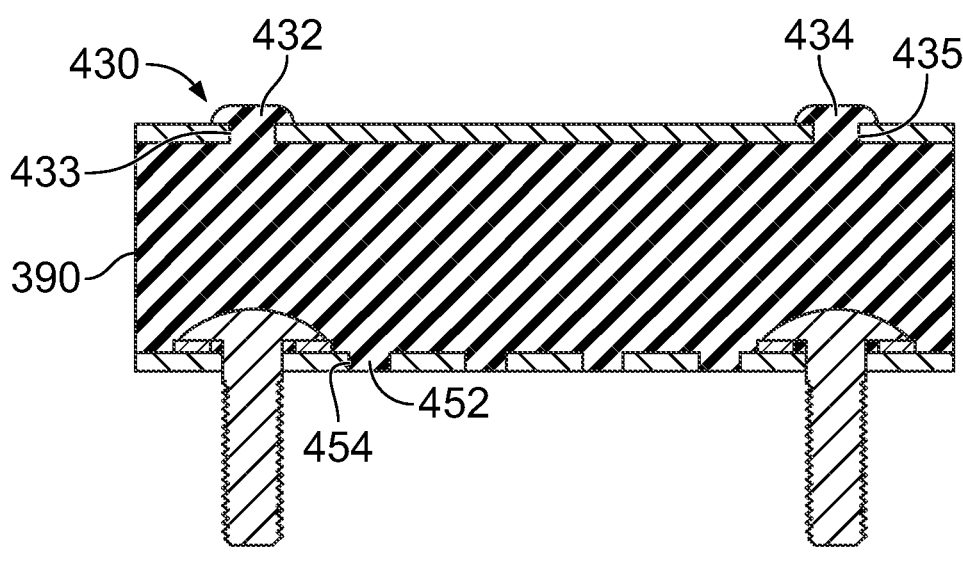
FIG. 12 is a cross-sectional view taken along line 12-12 in FIG. 11 showing the elastomeric material covering head portions of the fasteners in the pocket of the blade mount member.

Regarding FIGS. 11 and 12, the scraper blade mount 320 includes front interlocking portions 430 that include lower protrusions 432, 434 of the elastomeric member 390 and openings 433, 435 of the blade mount member 360. The scraper blade mount 320 has rear interlocking portions 450 (see FIG. 11) that include protrusions 452 of the elastomeric member 390 and openings 454 of the base plate portion 366.

Figure 13:
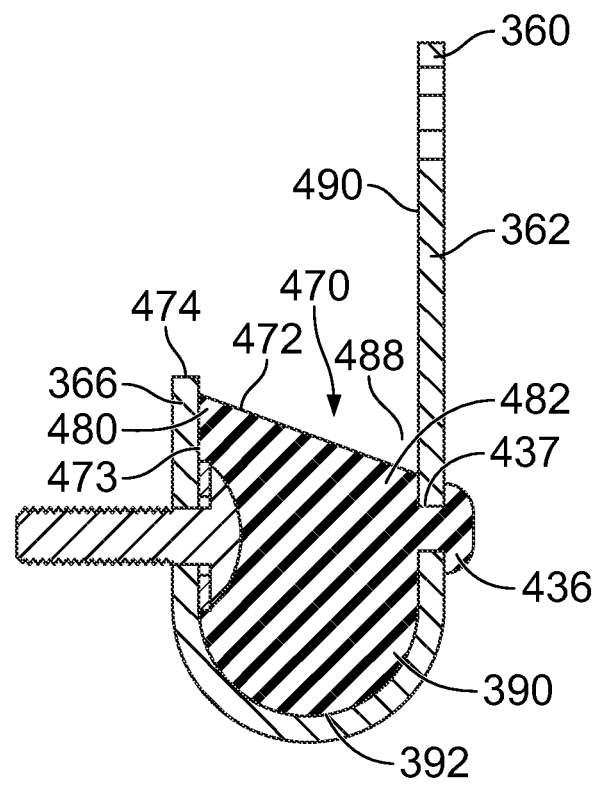
FIG. 13 is a cross-sectional view taken along line 13-13 in FIG. 11 showing the elastomeric member having an inclined upper surface so as to have a raised portion near the base plate portion and a lowered portion by the blade support plate portion.

With reference to FIG. 13, another feature of the scraper blade mount 320 that reduces the rigidity of the scraper blade mount 320 compared to the scraper blade mount 30 discussed above is that the elastomeric member 390 has an upper portion 470 with an upper surface 472 that slants downwardly from a free end 474 of the base plate portion 366 toward the scraper plate portion 362. The upper portion 470 thereby has a raised portion 480 at the base plate portion 366 and a lowered portion 482 at the scraper plate portion 362. The downward sloping upper surface 470 forms a recess 488 at an inside surface 490 of the scraper plate portion 362. The recess 488 removes elastomeric material near the scraper plate portion 362 so that the elastomeric material 392 provides less bias force against the blade support plate portion 362 as the blade support plate portion 362 moves toward the base plate portion 366.

The presence of the elastomeric member 390 in the pocket 392 of the blade mount member 362 inhibits debris from filling the pocket 392. Debris that accumulates on the upper surface 472 of the elastomeric member 390 is urged off of the elastomeric member 390 by vibrations during conveyor belt operation. Further, movement of the blade support plate portion 362 toward the base portion 366 compresses the elastomeric member 390 and causes an upward bulge of the upper surface 472 which generates movement of the debris and helps urge debris off of the upper surface 472.

Figure 14:
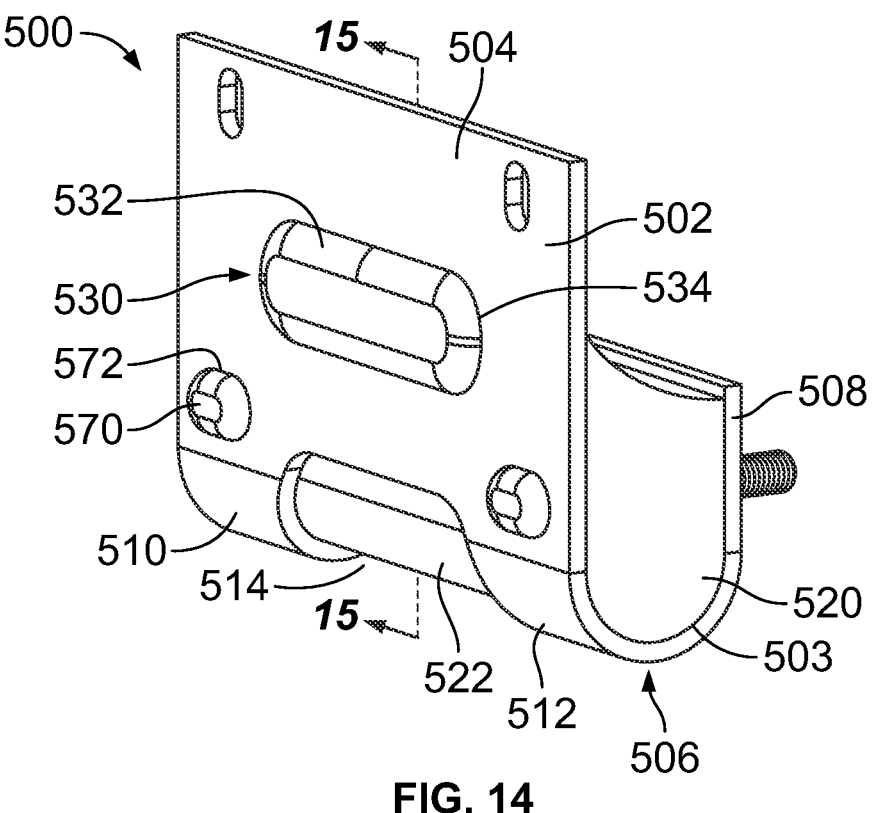
FIG. 14 is a front perspective view of another scraper blade mount having a blade mount member with a pair of spaced apart, lower loop portions and an elastomeric member having an uninterrupted lower portion that extends across the lower loops.

Regarding FIG. 14, a scraper blade mount 500 is provided that is similar in many respects to the scraper blade mounts 30, 320 discussed above such that differences will be highlighted. The scraper blade mount 500 has a blade mount member 502 with a blade support plate portion 504, an arcuate portion 506, and a base plate portion 508. The blade mount member 502 has a pocket 503 that receives an elastomeric member 520.

The arcuate portion 506 includes loops 510, 512 and a spacing 514 between the loops 510, 512. Unlike the scraper blade mount 320 discussed above, the elastomeric member 520 of the scraper blade mount 500 has an uninterrupted lower portion 522 that is similar to the uninterrupted lower portion 400 of the scraper blade mount 30. The presence of the uninterrupted lower portion 522 provides additional elastomeric material in the pocket 503 to resist movement of the blade support plate portion 504 relative to the base plate portion 508.

Another difference between the scraper blade mount 500 and the scraper blade 320 discussed above is that the scraper blade mount 500 has interlocking portions 530 that include an upper protrusion 532 extending through an upper opening 534 of the blade support portion 504. Regarding FIG. 15, the elastomeric member 520 has an upper portion 540 with a concave upper surface 542 that curves downwardly from a raised portion 544 at an inner surface 546 of the scraper plate portion 504 downward toward a lower portion 550 at an inner surface 552 of the base plate portion 508. The upper portion 540 of the elastomeric member 520 provides support for the scraper plate portion 504 a distance 554 above a free end 556 of the base plate portion 508.

Figure 17:
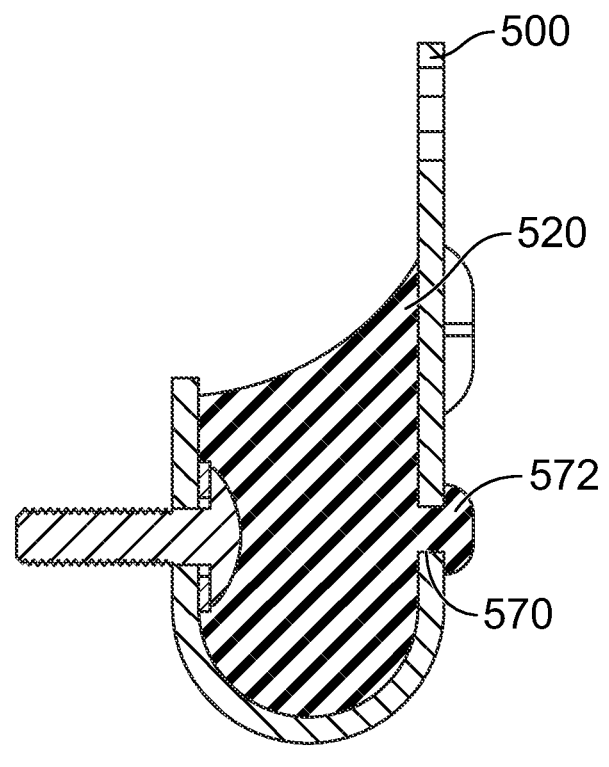
FIG. 17 is a cross-sectional view taken across line 17-17 in FIG. 16 showing a head portion of the fastener and a washer covered by the elastomeric member in the pocket of the scraper blade mount.

With reference to FIGS. 14 and 17, the front interlocking portions 530 include lower protrusions 570 extending through lower openings 572 of the blade support plate portion 504. The scraper blade mount 500 further includes rear interlocking portions 580 including protrusions 582 of the elastomeric material 520 and openings 584 of the base plate portion 508.

Figure 15:
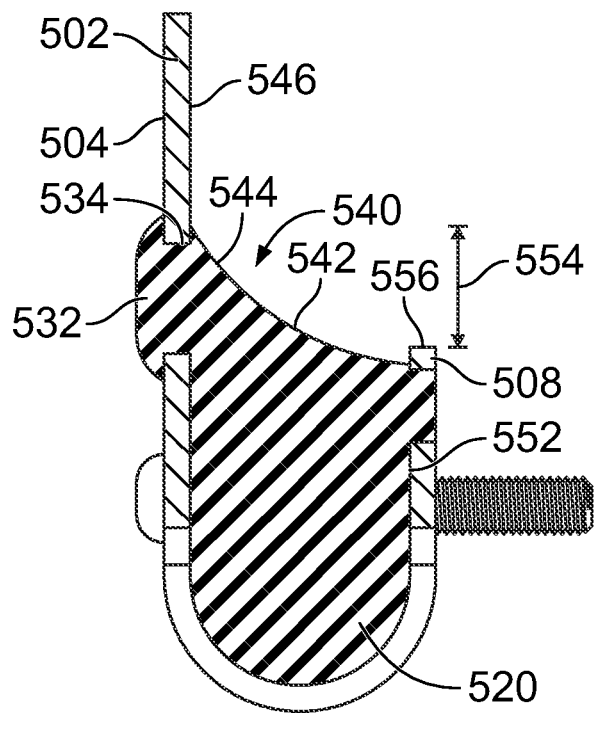
FIG. 15 is a cross-sectional view taken across line 15-15 in FIG. 14 showing the elastomeric member having a curved, inclined upper surface so as to have a raised portion near the blade support plate portion and a lowered portion near the base plate portion.
Figure 16:
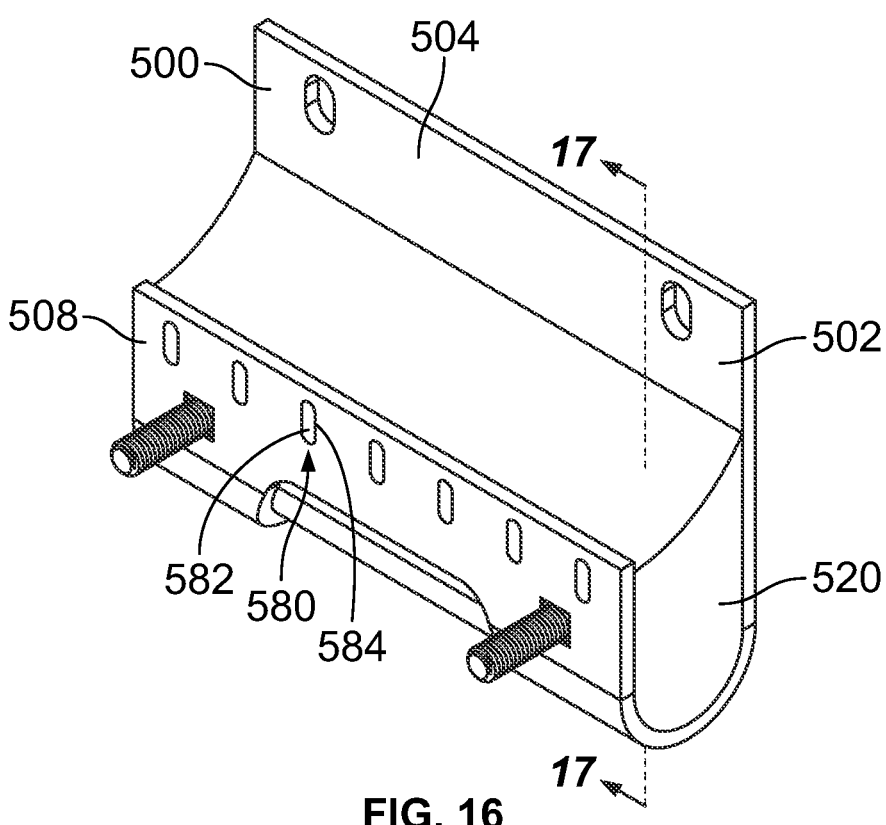
FIG. 16 is a rear perspective view of the scraper blade mount of FIG. 14 showing protrusions of the elastomeric member and fasteners extending in openings of the base plate portion.

Comparing FIGS. 6 and 15, the scraper blade mount 30 has a larger portion of elastomeric material 334 above the free end 190 of the base plate portion 64 compared to the elastomeric member 520 of the scraper blade mount 500. This removed elastomeric material of the scraper blade mount 500 reduces the rigidity of the scraper blade mount 500 as compared to the scraper blade mount 30. Further, the spacing 514 between the loops 510, 512 (see FIG. 14) reduces the rigidity of the blade mount member 502 compared to the blade mount member 32.

Thus, comparing the blade mount members 30, 320, 500, the scraper blade mount 30 is the most rigid, the scraper blade mount 320 is the least rigid, and the scraper blade mount 500 has a rigidity that is between the scraper blade mounts 30, 320. In accordance with the foregoing, the scraper blade mount for a particular application may be chosen to provide the rigidity and resiliency desired for a particular conveyor belt system.

Figure 18:
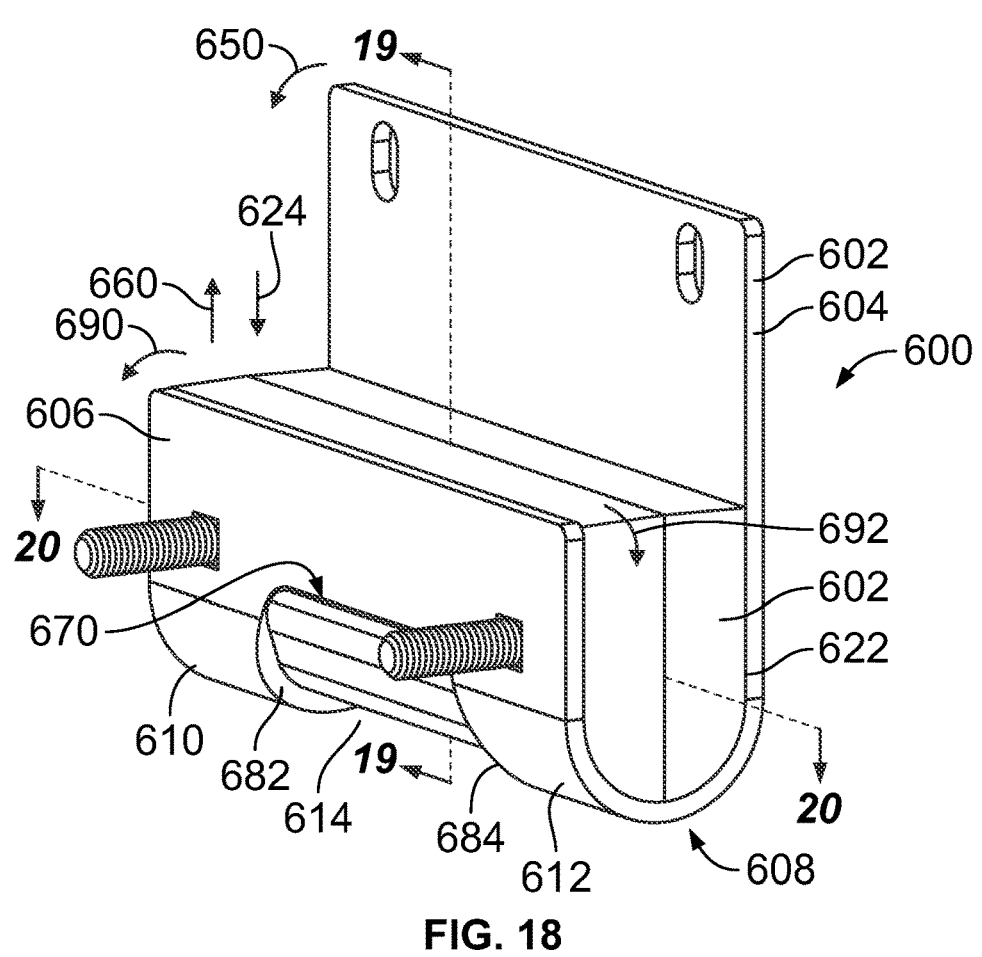
FIG. 18 is a perspective view of a scraper blade mount having an elastomeric member assembled with a blade mount member of the scraper blade mount.

Regarding FIG. 18, a scraper blade mount 600 is provided that is similar in many respects to the scraper blade mounts discussed above. The scraper blade mount 600 has a generally J-shaped blade mount member 602 that may be made from a metallic material, such as a spring steel. The blade mount member 602 has a blade support plate portion 604, a base plate portion 606, and an arcuate portion 608 connecting the blade support plate portion 604 and the base plate portion 606. The arcuate portion 608 includes spaced loop portions 610, 612 having an opening 614 therebetween. The scraper blade mount 600 further includes an elastomeric member 620 received in a pocket 622 of the blade mount member 602.

The manufacture of the scraper blade mount 600 includes advancing the elastomeric member 620 in direction 624 into the pocket 622 of the blade mount member 602 rather than forming the elastomeric member 620 in situ with the blade mount member 602. Prior to assembly of the elastomeric member 620 and blade mount member 602, the elastomeric member 620 has an initial maximum width 630 (see FIG. 21) that is larger than a width 632 (see FIG. 22) between the blade support plate portion 604 and the base plate portion 606 at an upper opening 780 to the pocket 622. As shown in FIG. 22, the blade mount member 602 has an initial, undeflected configuration wherein the blade support plate portion 604 is initially inclined at an angle 640 relative to a plane 636 extending parallel to the base plate portion 606.

The process of advancing the elastomeric member 620 into the pocket 622 of the blade mount member 602 urges the blade support plate portion in direction 642 until the blade support plate portion is 604 is aligned with the plane 636 as the elastomeric member 620 is also being compressed, as shown in FIGS. 22-24. In this manner, the assembly of the elastomeric member 620 and the blade mount member 602 creates a preload in the blade mount member 602 including tension and compression in the loop portions 610, 612. Further, the assembly of the elastomeric member 620 and blade mount member 602 creates a preload in the elastomeric member 620 due to the elastomeric member 620 being compressed between the blade support plate portion 604 and the base plate portion 606.

Returning to FIG. 18, once a conveyor belt cleaner including the scraper blade mount 600 has been installed to scrape a conveyor belt, the scraper blade mount 600 is further loaded due to the scraper blade tip tension the scraper blade mount 600 applies to the scraper blade. For example, during installation of a conveyor belt cleaner that includes the scraper blade mount 600, the conveyor belt cleaner is adjusted to tension the scraper blade supported by the scraper blade mount 600 against the conveyor belt. The tensioning operation deflects the scraper blade and the blade support plate portion 604 by, for example, 4 mm. Thus, the scraper blade supported by the scraper blade mount 600 applies a scraping force against the belt and the belt applies a reaction force against the scraper blade in an opposite direction. The reaction force deflects the blade support plate portion 604 in direction 650 (see FIG. 18) and further loads the scraper blade mount 600 to a steady-state preload. The steady-state preload corresponds to the deformation in the scraper blade mount 600 once the scraper blade mount 600 has been installed but the conveyor belt is not running or when the conveyor belt is running and the scraper blade is engaged with the relatively smooth outer surface of the conveyor belt.

When the conveyor belt is running, a mechanical splice of the conveyor belt may impact the scraper blade supported on the blade support plate portion 604. The blade support plate portion 604 pivots backward in direction 650 to provide clearance for the scraper blade to travel over the splice. The pivoting of the blade support plate portion 604 in direction 650 bends the spaced loops 610, 612, compresses the elastomeric member 620 between the blade support plate portion 604 and base plate portion 606, and increases the resilient load the scraper blade mount 600 applies to the scraper blade to return the scraper blade back into engagement with the belt. Once the scraper blade returns into engagement with the conveyor belt, the spaced loops 610, 612 and elastomeric member 620 have partially unloaded and the scraper blade mount 600 returns to the steady-state preload.

Due to the elastomeric member 620 being wider than the pocket 622, the elastomeric member is compressed between the base plate portion 606 and the blade support plate portion 604 when the elastomeric member 620 is advanced into the pocket 622. In this manner, the elastomeric member 620 has an interference fit with the blade mount member 602 to resist the elastomeric member shifting in direction 660 (see FIG. 18) out of the pocket 622 during conveyor belt operation. Further, the interference fit also inhibits water and water borne material from wicking into small spaces between the elastomeric member 620 and the blade mount member 602 that may be present about the periphery of the elastomeric member 620 due to manufacturing variations of the blade support member 602 and the elastomeric member 620.

Figure 19:
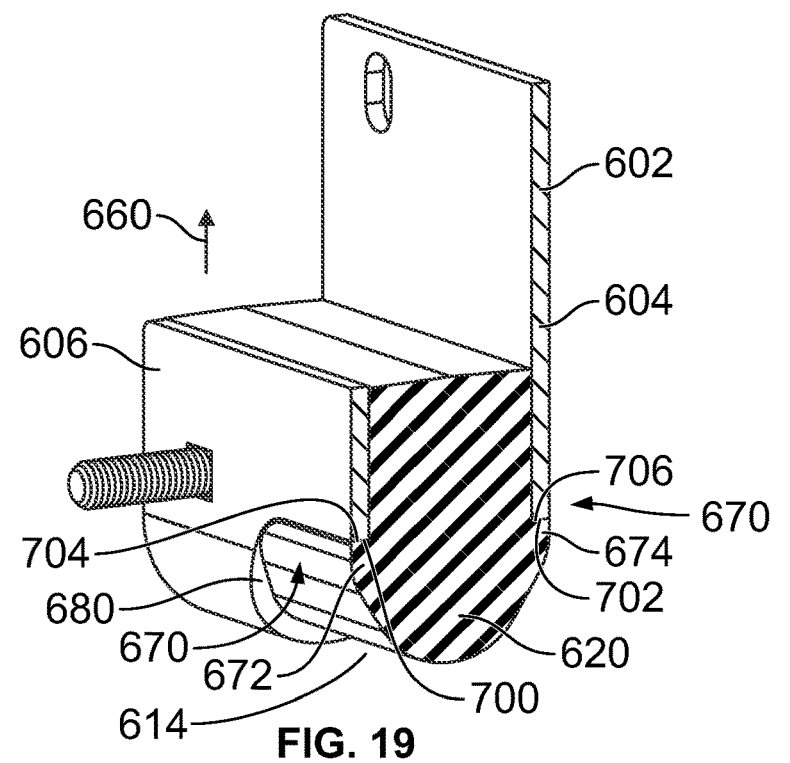
FIG. 19 is a cross-sectional view taken across line 19-19 in FIG. 18 showing snap-fit connections of the elastomeric member and blade mount member of FIG. 18.

The scraper blade mount 600 has a snap fit connection 670 that also resists movement of the elastomeric member 620 in the pocket 622. Regarding FIG. 19, the snap fit connection 670 includes snap fit connections 670 on opposite sides of the elastomeric member 620. The snap fit connections 670 can be formed by projections such as lugs 672, 674 on either side of the elastomeric member 620 that engage the base plate portion 606 and the blade support plate portion 604 to inhibit shifting of the elastomeric member 620 in direction 660 out of the pocket 622. More specifically, the lugs 672, 674 have upper surfaces 700, 702 that overlap or confront and engage lower stop surfaces 704, 706 of the base plate portion 606 and the blade support plate portion 604. The overlapping engagement between the surfaces 700, 704 and 702, 706 inhibits movement of the elastomeric member 620 in direction 660 out of the pocket 622. Additionally, the lugs 672, 674 each have opposite side surfaces 676, 678 (see FIG. 21) that can engage facing side surfaces 682, 684 (see FIG. 18) of the loop portions 610, 612. The engagement between the lug side surfaces 676, 678 and the loop side surfaces 682, 684 resists twisting movement of the elastomeric member 620 in directions 690, 692.

Figure 20:
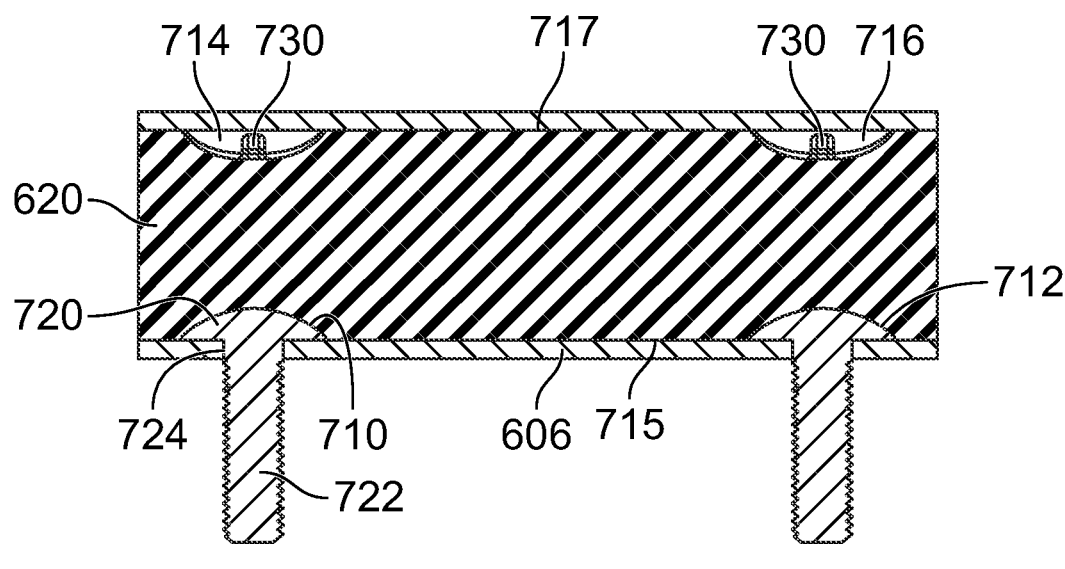
FIG. 20 is a cross-sectional view taken across line 20-20 in FIG. 18 showing head portions of bolts of the scraper blade mount received in pockets of the elastomeric member.
Figure 21:
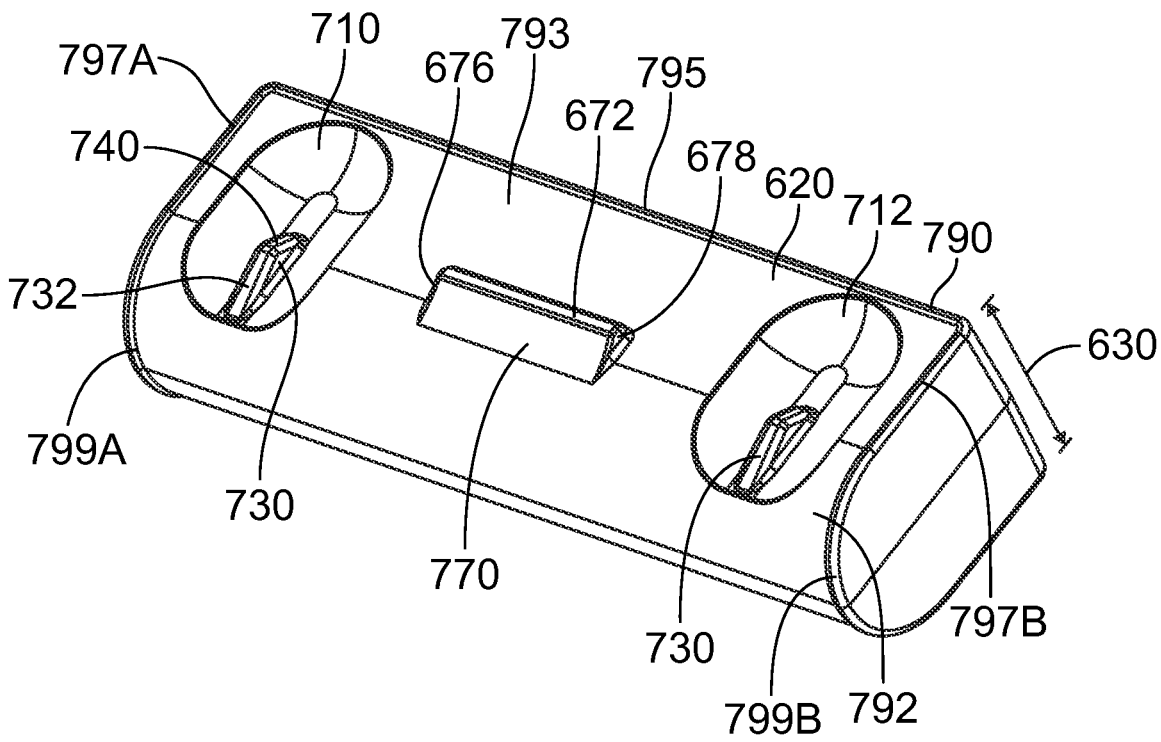
FIG. 21 is a perspective view of the elastomeric member of FIG. 18 showing retainers in the pockets of the elastomeric member to engage the bolt head portions received in the pockets of the elastomeric member.

Regarding FIGS. 20 and 21, the elastomeric member 620 has pockets 710, 712, 714, 716 on opposite sides 715, 717 of the elastomeric member 620. Each pocket 710, 712, 714, 716 is configured to receive a head portion 720 of one of the fasteners, such as a square neck carriage bolt 722 extending through a through opening 724 of the base plate portion 606. Because the opposite sides 715, 717 of the elastomeric member 620 include the pockets 710, 712, 714, 716, the elastomeric member 620 is bidirectional such that either side 715, 717 may be positioned to face the bolts 722. The bidirectional configuration of the elastomeric member 620 makes assembly of the elastomeric member 620 and blade mount member 602 simpler.

With reference to FIG. 21, the elastomeric member 620 has a retainer 730 in each pocket 710-716 that facilitates positioning of the elastomeric member 620 in the pocket 622 as well as resists shifting and/or turning of the bolt 722. More specifically, each retainer 730 includes a tapered surface 732 to cammingly engage an upper convex surface portion 734 of the associated bolt 722 as the elastomeric member 620 is advanced downwardly in direction 736 (see FIG. 23) into the pocket 622. The camming engagement assists in urging the base plate portion 606 away from the blade support plate portion 604 to temporarily widen the pocket 622 to receive the elastomeric member 620. Regarding FIGS. 21 and 24, the retainer 730 has an upper, fastener engaging surface 740 that engages a lower convex surface portion 735 of the bolt head portion 720 when the elastomeric member 620 has been seated in the pocket 622 as shown in FIG. 24. The fastener engaging surface 740 engages the convex outer surface 734 and resists turning of the bolt 722.

With reference to FIG. 22, the elastomeric member 620 has an initial, undeflected configuration wherein the elastomeric member has a maximum width 750 defined between side surfaces 752, 754 of the lugs 672, 674 that is wider than the initial width 632 between the blade support plate portion 604 and the base plate portion 606 at the upper opening 780 to the pocket 622. Further, the maximum width 750 is larger than a distance between the lower stop surfaces 704, 706 (see FIG. 19) of the base portion 606 and the blade support plate portion 604. The elastomeric member 620 further includes upper side surfaces 760, 762 with a width 764 therebetween that is also wider than the width 632.

With reference to FIGS. 22-24, the lugs 672, 674 have lower, tapered surfaces 770, 772 that cooperate with rounded lower surface portions 774, 776 of the elastomeric member 620 to cammingly engage the blade support plate portion 604, the base plate portion 606, and the head portion 720 of the bolts 722 as the elastomeric member 620 is advanced into the pocket 622. The camming engagement between the elastomeric member 620 and the blade support member 602 urges the blade support plate portion 604 and base plate portion 606 apart to temporarily, resiliently enlarge an upper opening 780 of the pocket 622 and facilitate advancing of the elastomeric member 620 fully into the pocket 622.

The lugs 672, 674 and the upper side surfaces 760, 762 are compressed by the blade mount member 602 as the elastomeric member 620 is advanced farther into the pocket 622 which reduces the widths 750, 764 (see FIG. 22) of the elastomeric member 620. As the elastomeric member 620 is seated in the pocket 622, the lugs 672, 674 snap into the opening 614 below the lower stop surfaces 704, 706 (see FIG. 19) of the base portion 606 and the blade support plate portion 604. Although the lugs 672, 674 rebound back to an expanded configuration once the elastomeric member 620 has been seated as shown in FIG. 24, the upper side surfaces 760, 762 of the elastomeric member 620 remain compressed together between the blade support plate portion 604 and the base plate portion 606 which applies a preload to the elastomeric member 620. Conversely, the compressed elastomeric member 620 applies a resilient reaction force against the blade support plate portion 604 and base plate portion 606 which deflects the blade support plate portion 604 to the position of the plane 636 in FIG. 22 and preloads the blade mount member 602. In other words, positioning the oversized elastomeric member 620 in the pocket 622 applies a preload to both the elastomeric member 620 and the blade mount member 602.

Regarding FIG. 21, the elastomeric member 620 has a ridge 790 protruding from a periphery of a generally U-shaped outer surface 792 of a body 793 of the elastomeric member 620. The ridge 790 engages an inner surface 793 (see FIG. 22) of the pocket 622 when the elastomer member 620 is seated in the pocket 622. The compression of the elastomeric member 620 between the blade support plate portion 604 and the base plate portion 606, as well as the seating of the elastomeric member 620 in the pocket 622, flattens the ridge 790 against the blade mount member 602. The engagement between the ridge 790 of the elastomeric member 620 and the inner surface 793 of the pocket 622 forms a seal that inhibits ingress of debris and liquid between the elastomeric member 620 and the blade mount member 602 and improves the durability of the scraper blade mount 600. The ridge 790 operates similarly to an o-ring and provides a tighter fit against the blade mount member 602 because the compression of the ridge 790 is greater than the compression of the body 793 of the resilient member 620. The ridge 790 includes a lateral ridge portion 795 and vertical ridge portions 797A, 797B that protrude to engage the blade support plate portion 604. The ridge 790 further includes arcuate ridge portions 799A, 799B that protrude to engage the arcuate portion 608 of the blade mount member 602. The ridge 790 extends onto the opposite side of the elastomeric member 620 (not shown in FIG. 21) and includes a lateral ridge portion and vertical ridge portions that protrude to engage the base plate portion 606 of the blade mount member 602. In one embodiment, the elastomeric member 620 is symmetrical such that the opposite sides of the elastomeric member 620 have identical ridge portions 795, 797A, 797B.

Figures 25, 26:
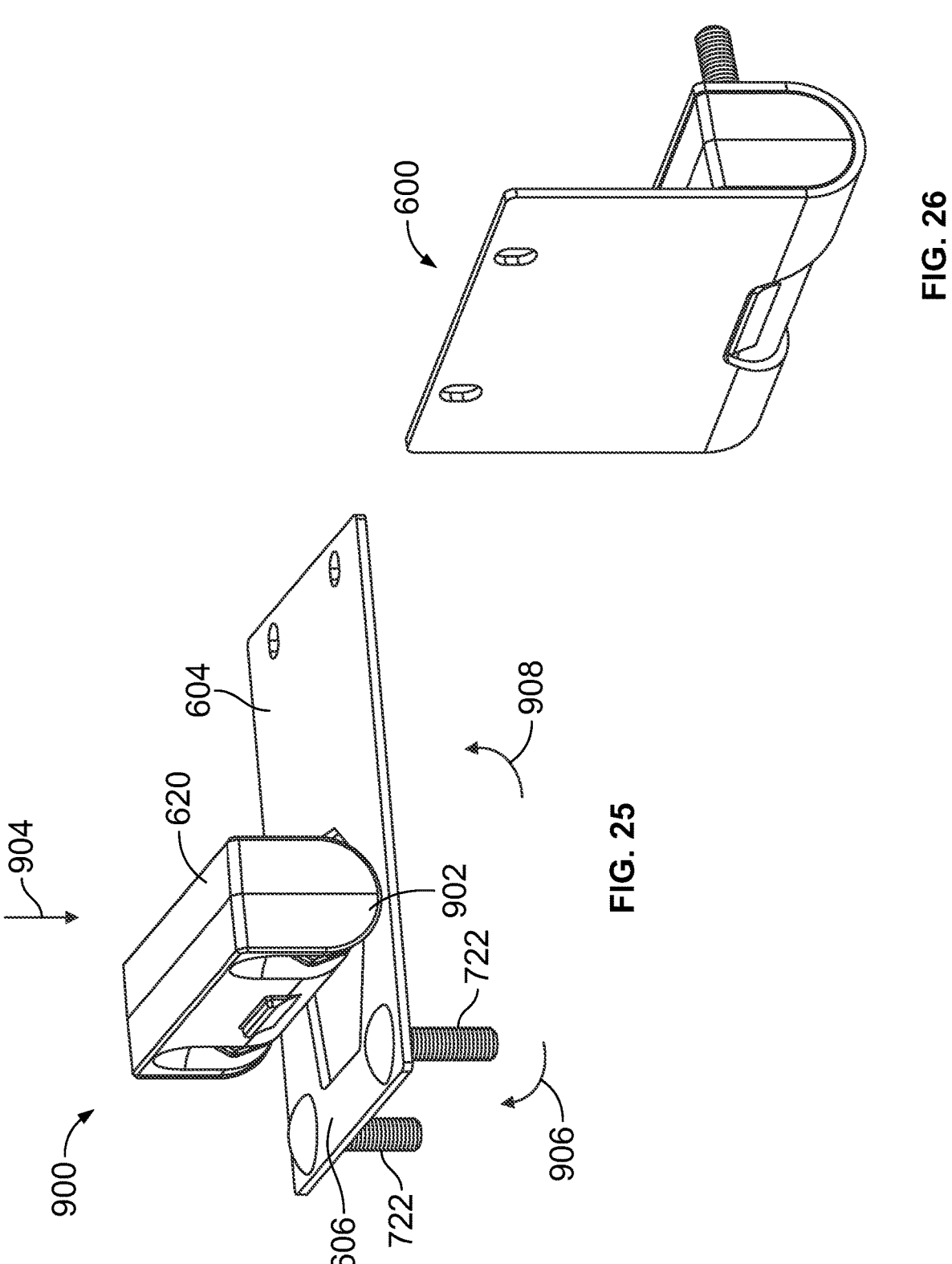
FIGS. 25 and 26 are perspective views of an alternative method for manufacturing the scraper blade mount of FIG. 18 wherein the blade mount member is bent around the elastomeric member.

With reference to FIGS. 25 and 26, an alternative method 900 is provided for assembling the scraper blade mount 600. The method 900 includes providing the blade mount member 602 in a flat configuration with the bolts 722 installed in the through openings 724 (see FIG. 23) of the base plate portion 606. The method 900 includes using a press machine to urge a lower leading end portion 902 of the elastomeric member 620 in direction 904 against the flat blade mount member 602 and bend the base plate portion 606 and the blade support plate portion 604 in directions 906, 908 around the elastomeric member 620. The elastomeric member 620 operates as a mandrel during the bending operation. The blade support plate portion 604 is overbent, such as to the position shown in FIG. 22, so that once the scraper blade mount 600 is removed from the press machine, the blade support plate portion 604 rebounds to a position substantially parallel to the base plate portion 606 as shown in FIG. 18.

Figure 27:
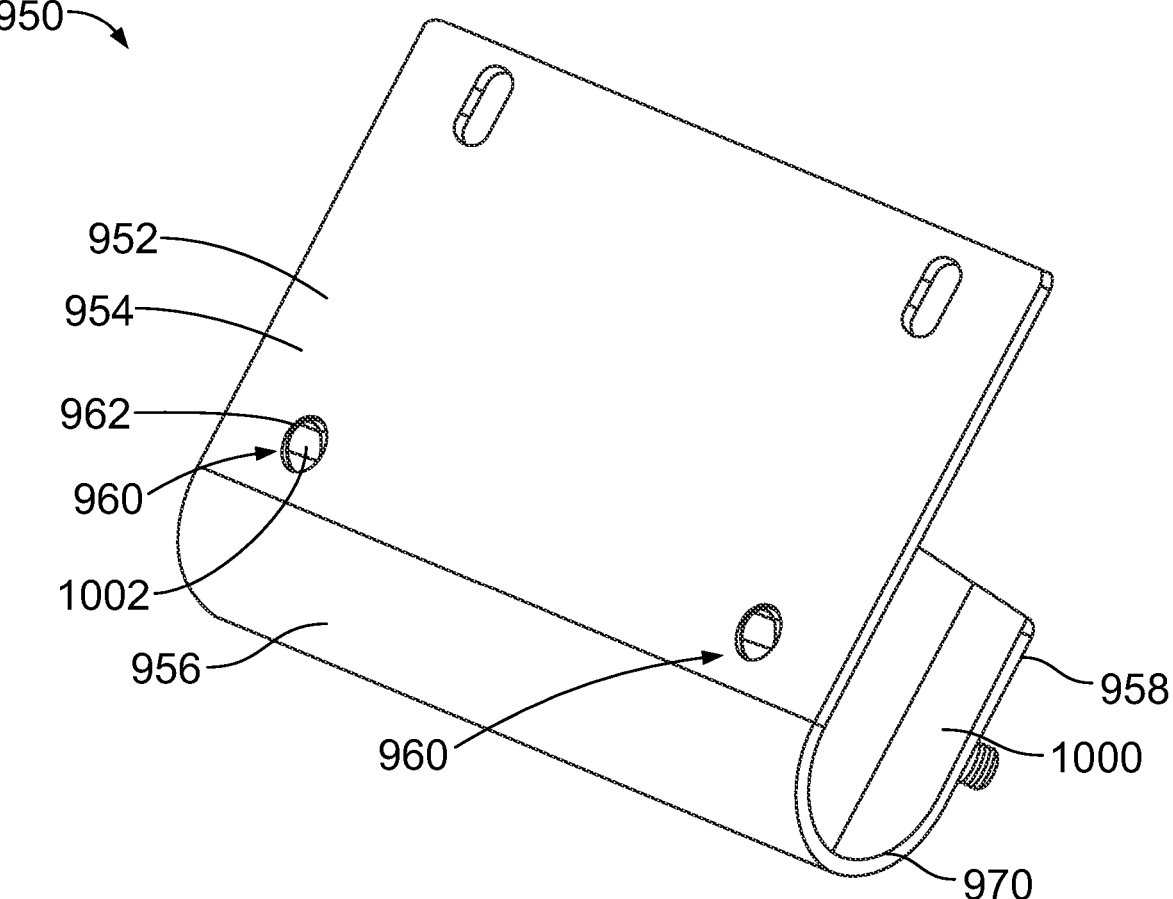
FIG. 27 is a perspective view of another scraper blade mount having two snap-fit connections between a blade support plate portion and an elastomeric member of the scraper blade mount.

Regarding FIG. 27, a scraper blade mount 950 is provided that is similar in many respects to the scraper blade mounts discussed above. The scraper blade mount 950 includes a blade mount member 952 and an elastomeric member 1000 assembled with the blade mount member 952. The blade mount member 952 includes a blade support plate portion 954, an arcuate portion 956, and a base plate portion 958. Unlike the arcuate portion 608 of the scraper blade mount 600 of FIG. 18, the arcuate portion 956 does not include a pair of spaced loops.

Figure 28:
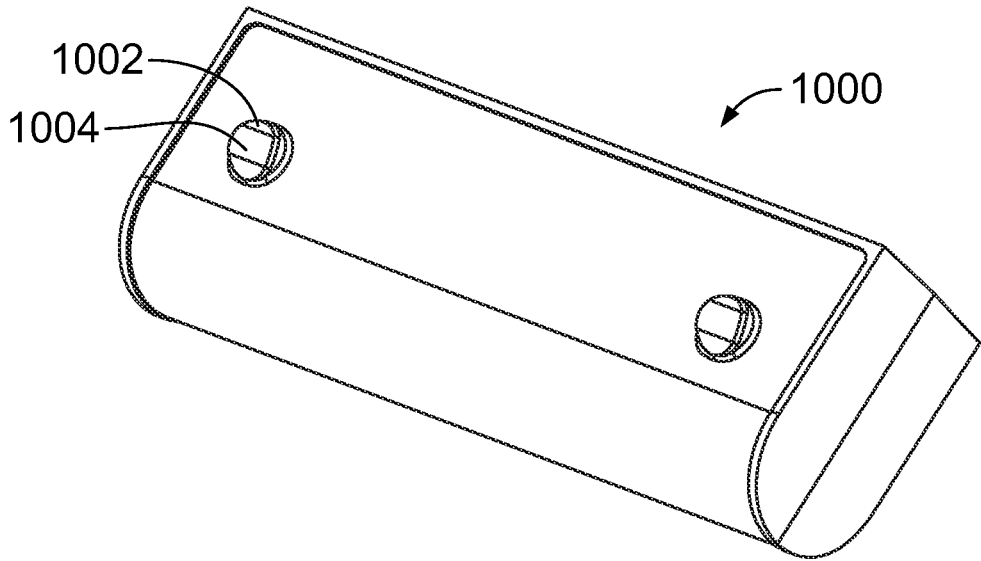
FIG. 28 is a perspective view of the elastomeric member of FIG. 27 showing plug portions of the elastomeric member that extend into the openings of the blade support plate portion.

With reference to FIGS. 27 and 28, the scraper blade mount 950 includes a pair of snap-fit connections 960 between the blade support plate portion 954 and the elastomeric member 1000. The snap-fit connections 960 each include a protrusion, such as a plug portion 1002, of the elastomeric member 1000 that extends into a respective through opening 962 of the blade mount member 952 once the elastomeric member 1000 has been seated in a pocket 970 of the blade mount member 952.

With reference to FIG. 28, the plug portions 1002 each have a tapered surface 1004 that cammingly engages the blade support plate portion 954 and urges the blade support plate portion 954 away from the base plate portion 958 as the elastomeric member 1000 is advanced into the pocket 970. The plug portions 1002 are compressed as the elastomeric member 1000 is advanced into the pocket 970 and resiliently rebound or snap outward to protrude into the openings 962 once the plug portions 1002 are aligned with the openings 962.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

While there have been illustrated and described particular embodiments of the present invention, it will be appreciated that numerous changes and modifications will occur to those skilled in the art, and it is intended for the present invention to cover all those changes and modifications which fall within the scope of the appended claims.

What is claimed is:

1. A scraper blade mount for a conveyor belt cleaner, the scraper blade mount comprising:
   a resilient, unitary blade mount member;
   an upwardly extending blade support portion of the blade mount member configured to have a scraper blade mounted thereto;
   an upwardly extending base portion of the blade mount member configured to be fixed to an elongate support of a conveyor belt cleaner;
   a lower arcuate portion of the blade mount member connecting the base portion and the blade support portion, the arcuate portion permitting movement of the blade support portion of the blade mount member relative to the base portion of the blade mount member during operation of the conveyor belt cleaner;
   a pocket of the blade mount member formed by the blade support portion, the arcuate portion, and the base portion to provide a spacing between the blade support portion and the base portion that permits movement of the blade support portion, the pocket having an upwardly facing opening, the lower arcuate portion of the blade mount member forming a bottom of the pocket opposite the upwardly facing opening of the pocket; and
   a blocker connected to the blade mount member configured to limit debris from entering the upwardly facing opening and accumulating in the pocket,
   wherein the arcuate portion of the blade mount member includes lower loop portions having a spacing therebetween.

2. The scraper blade mount of claim 1 wherein the base portion includes a base plate portion, and the blade support portion includes a blade support plate portion; and
   wherein the base plate portion and the blade support plate portion extend substantially parallel to one another.

3. The scraper blade mount of claim 1 wherein at least a portion of the blocker is in the pocket.

4. The scraper blade mount of claim 1 wherein the blocker is configured to be compressed with movement of the blade support portion toward the base portion.

5. The scraper blade mount of claim 1 wherein the blocker comprises an elastomeric member molded to or assembled with the blade mount member.

6. The scraper blade mount of claim 1 wherein the blocker has an upper surface extending from the blade support portion to the base portion of the blade mount member.

7. The scraper blade mount of claim 1 wherein the blocker comprises an elastomeric member having at least a portion thereof in the pocket.

8. The scraper blade mount of claim 7 wherein the elastomeric member comprises at least one of:
   rubber;
   polyurethane; and
   foam.

9. The scraper blade mount of claim 1 wherein the blade mount member is of a metallic material and the blocker comprises an elastomeric member; and
   wherein the elastomeric member and the blade mount member comprise interlocking portions that secure the elastomeric member and the blade mount member.

10. The scraper blade mount of claim 1 wherein the blade mount member is of a metallic material and the blocker comprises an elastomeric member;
    wherein at least one of the blade support portion and the base portion include an opening; and
    wherein the elastomeric member includes a protrusion extending through the opening and having an enlarged end portion configured to inhibit pull-through of the protrusion from the opening.

11. The scraper blade mount of claim 1 wherein the blade support portion and the base portion include openings; and
    wherein the blade mount member is of a metallic material and the blocker comprises a resilient member having protrusions extending through the openings of the blade support portion and the base portion.

12. The scraper blade mount of claim 1 wherein the blocker comprises an elastomeric member having a notched lower portion with a gap that opens to the spacing between the loops.

13. The scraper blade mount of claim 1 wherein the blocker comprises an elastomeric member having a lower portion with a convex lower surface that extends across the spacing between the loop portions of the arcuate portion so that a portion of the convex lower surface of the elastomeric member is not covered by the loop portions.

14. The scraper blade mount of claim 1 further comprising a threaded attachment member protruding from the base portion of the blade mount member on an opposite side of the base portion from the pocket for securing the blade mount member to the elongate support of the conveyor belt cleaner.

15. A scraper blade mount for a conveyor belt cleaner, the scraper blade mount comprising:
  a resilient, unitary blade mount member;
  an upwardly extending blade support portion of the blade mount member configured to have a scraper blade mounted thereto;
  an upwardly extending base portion of the blade mount member configured to be fixed to an elongate support of a conveyor belt cleaner;
  a lower arcuate portion of the blade mount member connecting the base portion and the blade support portion, the arcuate portion permitting movement of the blade support portion of the blade mount member relative to the base portion of the blade mount member during operation of the conveyor belt cleaner;
  a pocket of the blade mount member between the blade support portion and the base portion to provide a spacing therebetween that permits movement of the blade support portion, the pocket having an upwardly facing opening; and
  a blocker connected to the blade mount member configured to limit debris from entering the upwardly facing opening and accumulating in the pocket,
  wherein the base portion includes a non-circular opening, the scraper blade mount further comprising:
  a bolt having a head portion in the pocket, a neck portion having a non-circular cross section extending in the non-circular opening that forms a non-rotatable connection between the bolt and the base portion, and a threaded shank extending away from the base portion outside of the pocket.

16. The scraper blade mount of claim 1 wherein the blade support portion includes an opening to receive a fastener associated with the scraper blade.

17. The scraper blade mount of claim 1 wherein the blade support portion and the base portion extend upward from the arcuate portion, the blade support portion extending farther than the base portion.

18. A scraper blade mount for a conveyor belt cleaner, the scraper blade mount comprising:
  a resilient, unitary blade mount member;
  a blade support plate portion of the blade mount member configured for operatively mounting a scraper blade connected thereto, the blade support plate portion having a blade support plate portion inner surface and a blade support plate portion outer surface opposite the blade support plate portion inner surface;
  a base plate portion of the blade mount member configured for being secured to an elongate support of the conveyor belt cleaner, the base plate portion having a base plate portion inner surface and a base plate portion outer surface opposite the base plate inner surface;
  the blade support plate portion and the base plate portion extending substantially parallel to one another in an undeflected orientation of the blade support plate portion; and
  a pair of laterally spaced loop portions of the blade mount member interconnecting the blade support plate portion and the base plate portion so that the blade support plate portion inner surface faces the base plate portion inner surface, the blade mount member having a through opening between the laterally spaced loop portions with the loop portions being laterally spaced apart across the through opening from another, the laterally spaced loop portions of the blade mount member permitting resilient deflection of the blade support plate portion relative to the base plate portion in a downstream longitudinal direction during conveyor belt cleaner operation.

19. The scraper blade mount of claim 18 wherein the scraper blade support plate portion has a first free end and the base plate portion has a second free end; and
  wherein the scraper blade support plate portion and the base plate portion extend from the laterally spaced loop portions to the first and second free ends substantially parallel to one another in the undeflected orientation of the blade support plate portion.

20. The scraper blade mount of claim 18 wherein the unitary blade mount member has a J-shaped cross section in a plane normal to the blade support plate portion and the base plate portion such that the blade support plate portion is longer than the base plate portion.

21. The scraper blade mount of claim 18 wherein the blade support plate portion has openings to allow mounting members of the scraper blade to be fastened to the base plate portion.

22. The scraper blade mount of claim 18 wherein the blade support plate portion and the base plate portion extend away from the laterally spaced loop portions with the blade support plate portion extending farther from the laterally spaced loop portions than the base plate portion.

23. The scraper blade mount of claim 18 wherein the blade mount member is configured so that there is a space between the blade support plate portion and the base plate portion, the scraper blade mount further comprising:
  a blocker connected to the blade mount member to inhibit debris accumulation in the space between the blade support plate portion and the base plate portion.

24. The scraper blade mount of claim 23 wherein the blocker comprises an elastomeric member having at least a portion thereof in the space between the base plate portion and the blade support plate portion.

25. The scraper blade mount of claim 18 wherein the blade mount member comprises metallic material and has a through opening, the scraper blade mount further comprising:
  an elastomeric material on the blade mount member and including a portion extending in the through openings of the blade mount member.

26. The scraper blade mount of claim 18 further comprising a resilient material intermediate the blade support plate portion and the base plate portion, the resilient material being compressed with movement of the scraper blade support plate portion toward the base plate portion.

27. The scraper blade mount of claim 18 further comprising a resilient material intermediate the blade support plate portion and the base plate portion; and wherein the blade mount member and the resilient material include interlocking portions that secure the blade mount member and the resilient material.

28. The scraper blade mount of claim 18 wherein the base plate portion includes through openings, the scraper blade mount further comprising:

fasteners extending in the through openings of the base plate portion to connect to the elongate support of the conveyor belt cleaner.

29. The scraper blade mount of claim 18 wherein the blade mount member is of metallic material.

30. A scraper blade mount for a conveyor belt cleaner, the scraper blade mount comprising:

a resilient, unitary blade mount member;

a blade support plate portion of the blade mount member configured for operatively mounting a scraper blade connected thereto, the blade support plate portion having a blade support plate portion inner surface and a blade support plate portion outer surface opposite the blade support plate portion inner surface;

a base plate portion of the blade mount member configured for being secured to an elongate support of the conveyor belt cleaner, the base plate portion having a base plate portion inner surface and a base plate portion outer surface opposite the base plate inner surface;

the blade support plate portion and the base plate portion extending substantially parallel to one another in an undeflected orientation of the blade support plate portion; and an arcuate portion of the blade mount member interconnecting the blade support plate portion and the base plate portion so that the blade support plate portion inner surface faces the base plate portion inner surface, the arcuate portion of the blade mount member permitting resilient deflection of the blade support plate portion relative to the base plate portion during conveyor belt cleaner operation;

wherein the base plate portion includes a non-circular through opening, the scraper blade mount further comprising a fastener having a portion extending in the non-circular through opening, the fastener portion having a non-circular cross section configured to form a non-rotatable connection between the fastener and the base plate portion.

31. The scraper blade mount of claim 18 wherein the blade support plate portion and the base plate portion each include opposite inner and outer flat surface portions extending parallel to one another, the base plate portion having through openings extending between the inner and outer flat surface portions of the base plate portion sized to permit a fastener to extend therethrough.

32. The scraper blade mount of claim 18 wherein the base plate portion and the blade support plate portion are substantially flat.

33. The scraper blade mount of claim 1 wherein the blocker comprises an elastomeric member having at least a portion thereof in the pocket; and a snap-fit connection of the elastomeric member and the blade mount member.

\* \* \* \* \*